United States Patent
Elsherif et al.

(10) Patent No.: US 12,532,251 B2
(45) Date of Patent: Jan. 20, 2026

(54) CHANNEL SCAN IN MULTIPLE SERVICE PERIODS

(71) Applicant: QUALCOMM Incorporated, San Diego, CA (US)

(72) Inventors: Ahmed Ragab Elsherif, San Jose, CA (US); Venkatesh Chitturi, Hyderabad (IN); Vamsi Sanka, Hyderabad (IN); Sudhanshu Singh, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 375 days.

(21) Appl. No.: 18/463,773

(22) Filed: Sep. 8, 2023

(65) Prior Publication Data
US 2025/0088945 A1   Mar. 13, 2025

(51) Int. Cl.
H04W 48/16   (2009.01)
H04W 48/20   (2009.01)

(52) U.S. Cl.
CPC .......... *H04W 48/16* (2013.01); *H04W 48/20* (2013.01)

(58) Field of Classification Search
None
See application file for complete search history.

(56) References Cited

U.S. PATENT DOCUMENTS

| | | | |
|---|---|---|---|
| 7,406,296 B2 * | 7/2008 | Haartsen | H04W 72/1215 455/552.1 |
| 2006/0292987 A1 * | 12/2006 | Ophir | H04W 72/1215 455/552.1 |
| 2009/0170516 A1 * | 7/2009 | Ostrup | H04W 48/10 455/436 |
| 2020/0100089 A1 * | 3/2020 | Ferrari | H04W 8/005 |

FOREIGN PATENT DOCUMENTS

| | | |
|---|---|---|
| EP | 2658308 A1 | 10/2013 |
| EP | 3481091 B1 | 11/2020 |
| WO | 2022077826 A1 | 4/2022 |

OTHER PUBLICATIONS

International Search Report and Written Opinion—PCT/US2024/041905—ISA/EPO—Nov. 25, 2024.

* cited by examiner

*Primary Examiner* — Robert M Morlan
(74) *Attorney, Agent, or Firm* — Harrity & Harrity, LLP

(57) ABSTRACT

Various aspects of the present disclosure generally relate to wireless communication. In some aspects, a wireless communication device may scan a first channel for access points during a first non-extended-personal-area-network (non-XPAN) service period. The wireless communication device may scan the first channel in one or more additional non-XPAN service periods. Numerous other aspects are described.

30 Claims, 14 Drawing Sheets

Table 1100:

| Scan SP start | Scan SP End | Actual Scan start after CH switch delay (A) | Actual Scan end before CH switch delay to XPAN (B) | SP Start % 102 A % 102 | SP End % 102 B % 102 |
|---|---|---|---|---|---|
| 0 | 35 | 7.5 | 27.5 | 7.5 | 27.5 |
| 70 | 105 | 77.5 | 97.5 | 77.5 | 97.5 |
| 140 | 175 | 147.5 | 167.5 | 45.5 | 65.5 |
| 210 | 245 | 217.5 | 237.5 | 13.5 | 33.5 |
| 280 | 315 | 287.5 | 307.5 | 83.5 | 1.5 |
| 350 | 385 | 357.5 | 377.5 | 51.5 | 71.5 |
| 420 | 455 | 427.5 | 447.5 | 19.5 | 39.5 |
| 490 | 525 | 497.5 | 517.5 | 89.5 | 7.5 |

Table 1102 (SI=70, CH=7.5):

| | |
|---|---|
| XS XS | 40/102 |
| XS XS XS | 60/102 |
| XS XS XS XS | 66/102 |
| XS XS XS XS XS | 72/102 |
| XS XS XS XS XS XS | 78/102 |

Table 1104 (CH=7.5):

| | SI=130 | SI=120 | SI=110 | SI=100 | SI=90 |
|---|---|---|---|---|---|
| XS XS | 78/102 | 63/102 | 48/102 | 37/102 | 42/102 |
| XS XS XS | 102/102 | 81/102 | 56/102 | 39/102 | 54/102 |
| XS XS XS XS | 102/102 | 99/102 | 64/102 | 41/102 | 66/102 |

FIG. 11

| Scan SP start | Scan SP End | Actual Scan start after CH switch delay (A) | Actual Scan end before CH switch to XPAN (B) | Start % 102 (A % 102) | End % 102 (B % 102) |
|---|---|---|---|---|---|
| 0 | 65 | 7.5 | 57.5 | 7.5 | 57.5 |
| 130 | 195 | 137.5 | 187.5 | 35.5 | 85.5 |
| 260 | 325 | 267.5 | 317.5 | 63.5 | 11.5 |
| 390 | 455 | 397.5 | 447.5 | 91.5 | 39.5 |
| 520 | 585 | 527.5 | 577.5 | 6.5 | 67.5 |

CHANNEL SCAN IN MULTIPLE SERVICE PERIODS

FIELD OF THE DISCLOSURE

Aspects of the present disclosure generally relate to wireless communication and to techniques and apparatuses associated with scanning a channel in multiple service periods.

BACKGROUND

A wireless personal area network (WPAN) is a short-range wireless network typically established by a user to interconnect various personal devices, sensors, and/or appliances located within a certain distance or area of the user. For example, a WPAN based on a communication protocol such as a Bluetooth® (BT) protocol, a Bluetooth Low Energy (BLE) protocol, or a Zigbee® protocol may provide wireless connectivity to peripheral devices that are within a specific distance (e.g., 5 meters, 10 meters, 20 meters, 100 meters) of each other. Bluetooth is a short-range wireless communication protocol that supports a WPAN between a central device (such as a host device or a source device) and at least one peripheral device (such as a client device or a sink device). However, power consumption associated with Bluetooth communications that operate on a basic rate (BR) and/or enhanced data rate (EDR) physical layer may render WPAN communication impractical in certain applications.

Accordingly, to address the power consumption challenges associated with Bluetooth BR/EDR (sometimes referred to as a Bluetooth classic or Bluetooth legacy protocol), BLE (also referred to herein as WPAN LE) was developed and adopted in various applications in which data transfers are relatively infrequent to enable WPAN communication with low power consumption. For example, BLE exploits infrequent data transfer by using a low duty cycle operation and placing one or both of the central device and the peripheral device(s) into a sleep mode between data transmissions, thereby conserving power. Example applications that use BLE include battery-operated sensors and actuators in various medical, industrial, consumer, and fitness applications. BLE may also be used to connect devices such as BLE-enabled smartphones, tablets, laptops, earbuds, or the like. While traditional (or classic) Bluetooth and BLE offer certain advantages, there exists a need for further improvements in Bluetooth and BLE technology. For example, traditional Bluetooth and BLE have a limited range, have a limited data capacity throughput, and are susceptible to interference from other devices communicating in the same frequency band (such as via wireless local area network (WLAN) communications).

SUMMARY

Some aspects described herein relate to a method of wireless communication performed by a wireless communication device. The method may include scanning a first channel for access points during a first non-extended-personal-area-network (non-XPAN) service period. The method may include scanning the first channel in one or more additional non-XPAN service periods.

Some aspects described herein relate to an apparatus for wireless communication at a wireless communication device. The apparatus may include one or more memories and one or more processors coupled to the one or more memories. The one or more processors may be individually or collectively configured to cause the wireless communication device to scan a first channel for access points during a first non-XPAN service period. The one or more processors may be individually or collectively configured to cause the wireless communication device to scan the first channel in one or more additional non-XPAN service periods.

Some aspects described herein relate to a non-transitory computer-readable medium that stores a set of instructions for wireless communication by a wireless communication device. The set of instructions, when executed by one or more processors of the wireless communication device, may cause the wireless communication device to scan a first channel for access points during a first non-XPAN service period. The set of instructions, when executed by one or more processors of the wireless communication device, may cause the wireless communication device to scan the first channel in one or more additional non-XPAN service periods.

Some aspects described herein relate to an apparatus for wireless communication. The apparatus may include means for scanning a first channel for access points during a first non-XPAN service period. The apparatus may include means for scanning the first channel in one or more additional non-XPAN service periods.

Aspects generally include a method, apparatus, system, computer program product, non-transitory computer-readable medium, user equipment, base station, network entity, network node, central device, peripheral device, wireless communication device, access point, mobile station, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 11 is a diagram illustrating an examples of scan times, in accordance with the present disclosure.

FIG. 12 is a diagram illustrating an examples of scan times, in accordance with the present disclosure.

DETAILED DESCRIPTION

Figure 1:
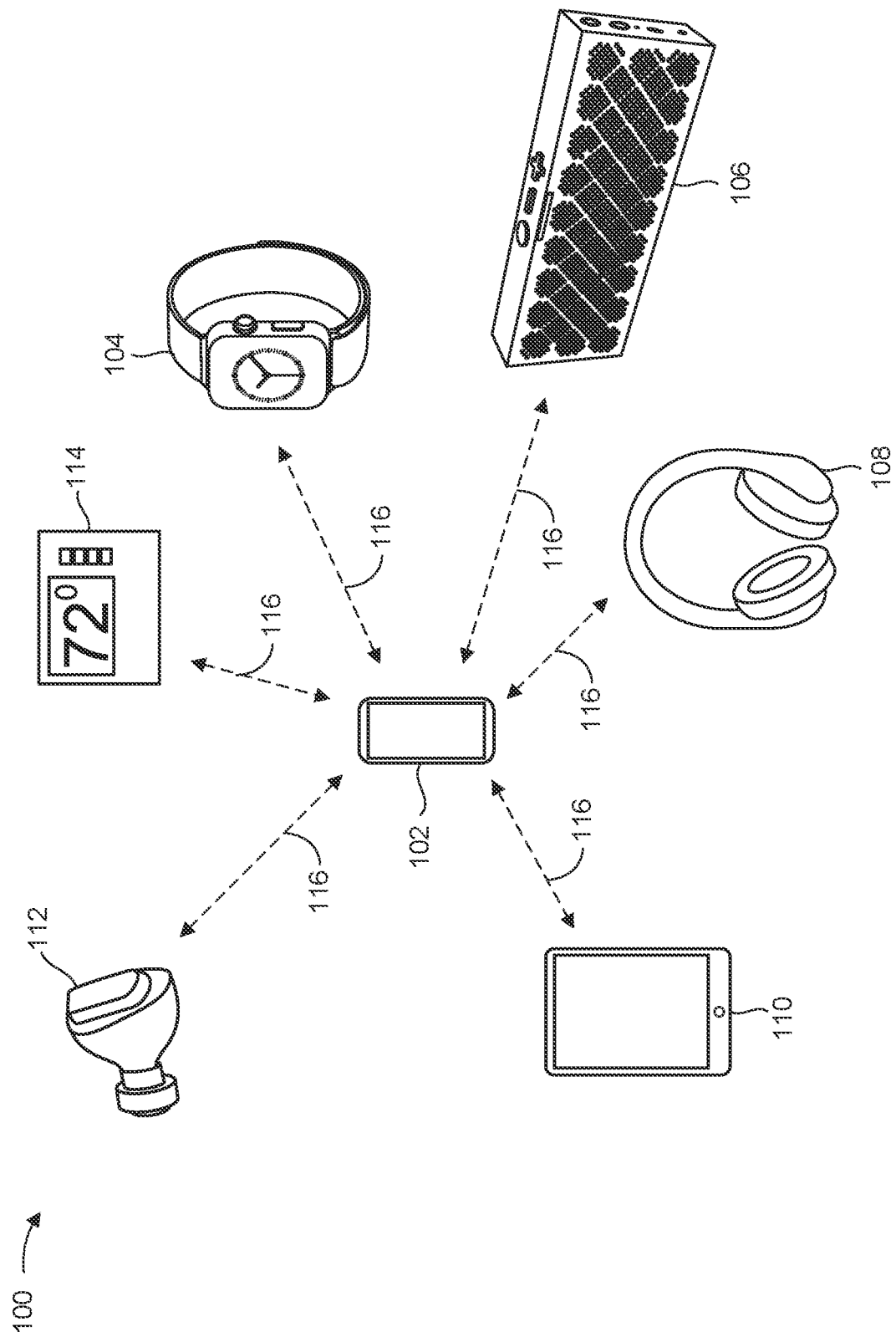
FIG. 1 is a diagram illustrating an example of a wireless personal area network (WPAN), in accordance with the present disclosure.

In a wireless personal area network (WPAN), such as a Bluetooth (BT) network or a Bluetooth Low Energy (BLE) network, wireless audio may stream from a central device (e.g., a handset, a smartphone) to multiple peripheral devices (e.g., a left earbud and a right earbud). These devices may operate as part of an extended personal area network (XPAN) that provides whole house coverage (WHC), where the devices may connect to each other and work throughout a home or office. In an XPAN, Wi-Fi features of an access point (AP) can be used to extend the connection between the handset and the earbuds beyond the range of Bluetooth for better WHC. For example, the handset may transmit audio data to the AP, which will then transmit the audio data to the earbuds. This means that a user can leave the handset on a desk in one room and hear the audio in the earbuds (or continue a phone call) in another room that is outside of the normal Bluetooth range (but within the range of the AP). In this way, a user does not need to carry the handset throughout the home or office to use wireless earbuds.

In some examples, an XPAN soft AP (SAP) may be running on a handset device. A target wake time (TWT) session may be established with peripheral devices (e.g., earbuds) and the handset device may expect to enter an XPAN channel based on the TWT service period (SP). The handset device may use a non-XPAN SP to go to any foreign channel (non-XPAN channel). However, scan results may be impacted when the handset device is expected to enter an XPAN channel based on the TWT service interval, and the handset device may not get a chance to stay on a scan channel for an expected amount of time. Therefore, scanning must be performed only in the non-XPAN SPs. If the non-XPAN SP time duration is small, the handset device may have less time to scan on a given channel. This may lead to low scan results as the handset device may not be able to scan all of the APs available in the channel. If the handset device spends less time on the scan channel, there is a chance that the handset device may miss a probe response from an AP when the device enters or switches to an XPAN channel. The handset may have trouble staying on a channel for a sufficient amount of time to receive beacons from APs. If the handset device misses AP beacons after scanning different channels, the handset device may not connect to an AP or may connect to a sub-optimal AP. This may result in increased latency and degraded traffic, which can waste signaling resources.

According to various aspects described herein, the handset device may scan for the same channel over multiple consecutive non-XPAN SPs. The handset device may scan the same channel multiple times so that an entire 102 ms of beacon intervals are covered. If device can cover the entire 102 ms non-overlapping time period with respect to the beacon interval, the handset device may have a 100% chance of obtaining scan results. If scan results are successful, an optimal AP may be used and communications may be successful. Successful communications reduce latency and conserve signaling resources.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a WPAN 100, according to some implementations. Within the WPAN 100, a central device 102 (which may be referred to herein as a source device or using other suitable terminology) may connect to and may establish a communication link 116 with one or more peripheral devices, such as a smartwatch 104, a Bluetooth portable speaker 106, wireless headphones 108, a tablet 110, a wireless earbud 112, a smart appliance 114 (which may be referred to herein as sink devices or using other suitable terminology) using a BLE protocol or a modified BLE protocol. The BLE protocol is part of the BT core specification and enables radio frequency communication operating within the globally accepted 2.4 GHz Industrial, Scientific, and Medical (ISM) band.

In some aspects, as described herein, the central device 102 may include suitable logic, circuitry, interfaces, processors, and/or code that may be used to communicate with the one or more peripheral devices 104, 106, 108, 110, 112, and/or 114 using the BLE protocol or the modified BLE protocol. In some aspects, the central device 102 may operate as an initiator to request establishment of a link layer (LL) connection with an intended peripheral device 104, 106, 108, 110, 112, and/or 114. In some aspects, a link manager may be used to control operations between a WPAN application controller in the central device 102 and a WPAN application controller in each of the intended peripheral devices 104, 106, 108, 110, 112, and/or 114.

In some aspects, after a requested LL connection is established, the central device 102 may become a host device, and the selected or intended peripheral device 104, 106, 108, 110, 112, and/or 114 may become paired with the central device 102 over the established LL connection. As a host device, the central device 102 may support multiple concurrent LL connections with various peripheral devices 104, 106, 108, 110, 112, and/or 114 that are operating as client devices. For example, the central device 102 may manage various aspects of data packet communication in an LL connection with one or more associated peripheral devices 104, 106, 108, 110, 112, and/or 114. For example, the central device 102 may determine an operation schedule in the LL connection with one or more peripheral devices 104, 106, 108, 110, 112, and/or 114. The central device 102 may also initiate an LL protocol data unit (PDU) exchange sequence over the LL connection. LL connections may be configured to run periodic connection events in dedicated data channels. The exchange of LL data PDU transmissions between the central device 102 and one or more of the peripheral devices 104, 106, 108, 110, 112, and/or 114 may take place within connection events.

In some aspects, the central device 102 may be configured to transmit the first LL data PDU in each connection event to an intended peripheral device 104, 106, 108, 110, 112, and/or 114. Additionally, or alternatively, in some aspects, the central device 102 may utilize a polling scheme to poll the intended peripheral device 104, 106, 108, 110, 112, and/or 114 for an LL data PDU transmission during a connection event. The intended peripheral device 104, 106, 108, 110, 112, and/or 114 may transmit an LL data PDU upon receipt of a packet carrying an LL data PDU from the central device 102. In some other aspects, a peripheral device 104, 106, 108, 110, 112, and/or 114 may transmit an LL data PDU to the central device 102 without first receiving an LL data PDU from the central device 102.

Examples of the central device 102 may include a cellular phone, a smartphone, a session initiation protocol (SIP) phone, a mobile station (STA), a laptop, a personal computer (PC), a desktop computer, a personal digital assistant (PDA), a satellite radio, a global positioning system, a multimedia device, a video device, a digital audio player, a camera, a game console, a tablet, a smart device, a wearable device (such as a smart watch or wireless headphones), a vehicle, a vehicle infotainment system or car kit, an electric meter, a gas pump, a toaster, a thermostat, a hearing aid, a blood glucose on-body unit, an Internet-of-Things (IoT) device, or the like.

Examples of the one or more peripheral devices 104, 106, 108, 110, 112, and/or 114 may include a cellular phone, a smartphone, an SIP phone, an STA, a laptop, a PC, a desktop computer, a PDA, a satellite radio, a global positioning system, a multimedia device, a video device, a digital audio player, a camera, a game console, a tablet, a smart device, a wearable device (e.g., a smart watch, wireless headphones, or wireless earbuds), a vehicle, a vehicle infotainment system or car kit, an electric meter, a gas pump, a toaster, a thermostat, a hearing aid, a blood glucose on-body unit, an IoT device, or the like. Although the central device 102 is illustrated in FIG. 1 as being in communication with six peripheral devices 104, 106, 108, 110, 112, and 114 in the WPAN 100, it will be appreciated that the central device 102 may communicate with more or fewer than six peripheral devices within the WPAN 100 without departing from the scope of the present disclosure.

In some aspects, a device implementing the BT protocol (e.g., the central device 102) may operate according to a first radio mode (e.g., a basic rate (BR)/enhanced data rate (EDR) radio mode), and a device implementing the BLE protocol may operate according to a second radio mode (e.g., the BLE radio mode). In some aspects, the central device 102 may be configured with dual radio modes, and therefore may be able to operate according to the BR/EDR mode or the BLE mode, for example, based on the type of short-range wireless communication in which the central device 102 may engage.

For example, in some aspects, the central device 102 may operate according to the BR/EDR mode for continuous streaming of data, for broadcast networks, for mesh networks, and/or for some other applications in which a relatively higher data rate may be more suitable. Additionally, or alternatively, the central device 102 may operate according to the BLE mode for short burst data transmissions, such as for some other applications in which power conservation may be desirable and/or a relatively lower data rate may be acceptable. Additionally, or alternatively, in some aspects, the central device 102 may operate according to one or more other radio modes, such as proprietary radio mode(s). Examples of other radio modes may include high speed radio modes, low energy radio modes, and/or isochronous radio modes, among other examples.

In some aspects, as described in more detail elsewhere herein, an assisting wireless device (e.g., among peripheral devices 104, 106, 108, 110, 112, and 114) may track a first retransmission metric that is based on a number of retransmitted packets that the assisting wireless device received from a source device, such as the central device 102. The assisting wireless device may receive, from a sink wireless device (e.g., among peripheral devices 104, 106, 108, 110, 112, and 114), an acknowledgement assistance request indicating a second retransmission metric for the sink wireless device. The assisting wireless device may transmit, to the sink wireless device, a response to the acknowledgement assistance request based on respective values of the first retransmission metric and the second retransmission metric. Additionally, or alternatively, the assisting wireless device may perform one or more other operations described herein.

In some aspects, as described in more detail elsewhere herein, a sink wireless device (e.g., among peripheral devices 104, 106, 108, 110, 112, and 114) may track a first retransmission metric that is based on a number of retransmitted packets that the sink wireless device received from a source device, such as the central device 102. The sink wireless device may transmit, to an assisting wireless device (e.g., among peripheral devices 104, 106, 108, 110, 112, and 114), an acknowledgement assistance request indicating the first retransmission metric tracked by the sink wireless device. The sink wireless device may receive, from the assisting wireless device, a response to the acknowledgement assistance request based on respective values of the first retransmission metric tracked by the sink wireless device and a second retransmission metric tracked by the assisting wireless device. Additionally, or alternatively, the sink wireless device may perform one or more other operations described herein.

As indicated above, FIG. 1 is provided as an example. Other examples may differ from what is described with regard to FIG. 1.

Figure 2:
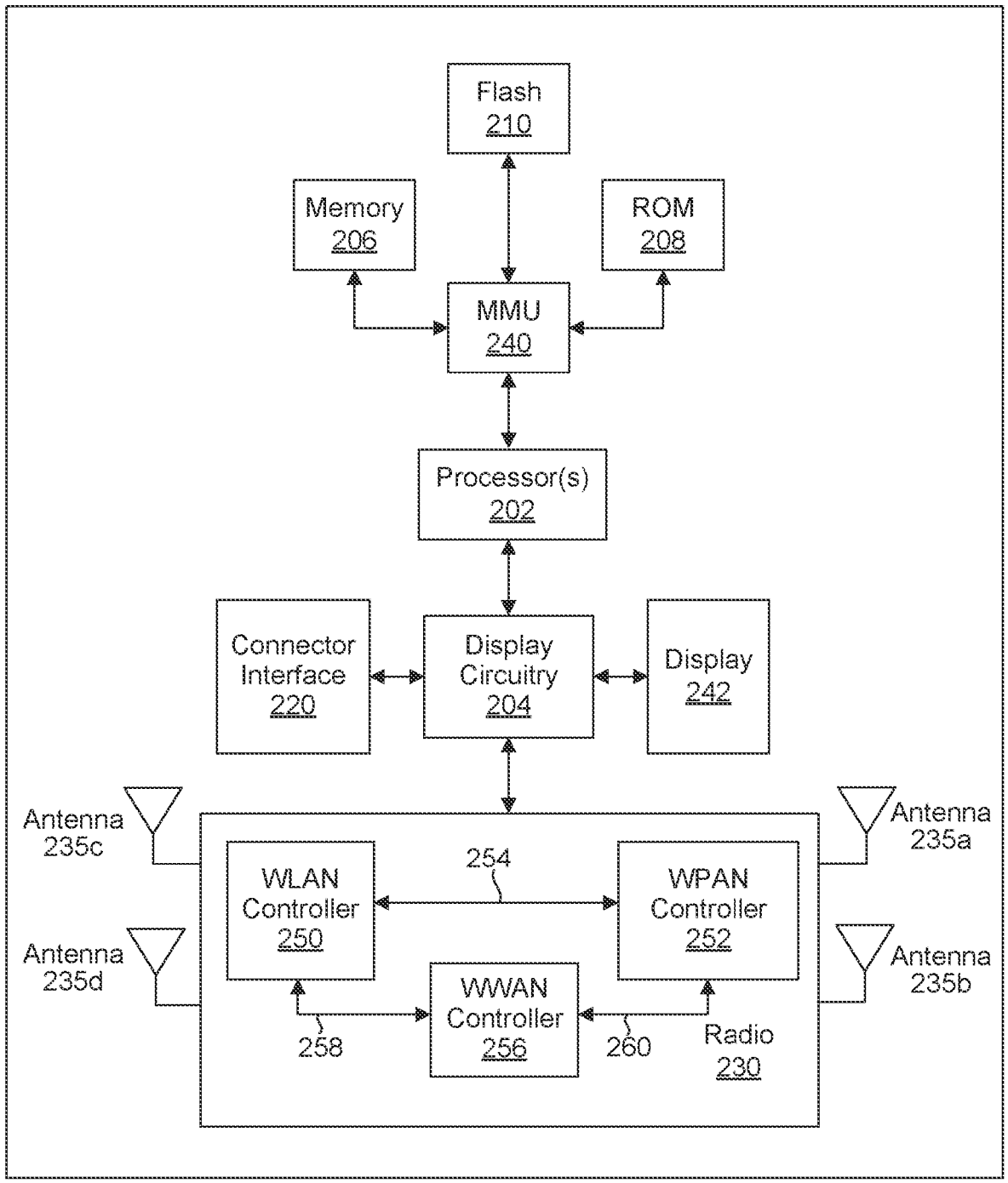
FIG. 2 is a diagram illustrating an example of a wireless communication device, in accordance with the present disclosure.

FIG. 2 is a diagram illustrating an example of a wireless communication device 200, in accordance with the present disclosure. In some aspects, the wireless communication device 200 may be an example of the central device 102 illustrated in FIG. 1. Additionally, or alternatively, the wireless communication device 200 may be an example of one or more of the peripheral devices 104, 106, 108, 110, 112, or 114 illustrated in FIG. 1. In some aspects, the wireless communication device 200 may be a Bluetooth-enabled device (such as a BLE device).

As shown in FIG. 2, the wireless communication device 200 may include a processing element, such as processor(s) 202, which may execute program instructions for the wireless communication device 200. The wireless communication device 200 may also include a display 242 that can perform graphics processing and present information to a user. The processor(s) 202 may also be coupled to a memory management unit (MMU) 240, which may be configured to receive addresses from the processor(s) 202 and translate the addresses to address locations in memory such as memory 206, ROM 208, or flash memory 210 and/or to address locations in other circuits or devices, such as display circuitry 204, radio 230, connector interface 220, and/or display 242. The MMU 240 may also be configured to perform memory protection and page table translation or set up. In some aspects, the MMU 240 may be included as a portion of the processor(s) 202.

The processor(s) 202 may be coupled to other circuits of the wireless communication device 200. For example, the wireless communication device 200 may include various memory types, a connector interface 220 through which the wireless communication device 200 can communicate with a computer system, and wireless communication subsystems that can transmit data to, and receive data from, other devices based on one or more wireless communication standards or protocols. For example, in some aspects, the wireless communication subsystems may include (but are not limited to) a wireless local-area network (WLAN) subsystem, a WPAN subsystem, and/or a cellular subsystem (such as a Long-Term Evolution (LTE) or New Radio (NR) subsystem). The wireless communication device 200 may include multiple antennas 235a, 235b, 235c, and/or 235d for performing wireless communication with, for example, wireless communication devices in a WPAN. In some aspects, the WPAN may be an XPAN.

The wireless communication device 200 may be configured to implement part or all of the techniques described herein by executing program instructions stored on a memory medium (such as a non-transitory computer-readable memory medium) and/or through hardware or firmware operation. In other embodiments, the techniques described herein may be at least partially implemented by a programmable hardware element, such as an FPGA, and/or an application specific integrated circuit (ASIC).

In some aspects, the radio 230 may include separate controllers configured to control communications for various respective radio access technology (RAT) protocols. For example, as shown in FIG. 2, radio 230 may include a WLAN controller 250 that manages WLAN communications, a WPAN controller 252 that manages Bluetooth, BLE, and/or other suitable WPAN communications, and a wireless wide area network (WWAN) controller 256 that manages WWAN communications. In some aspects, the wireless communication device 200 may store and execute a WLAN software driver for controlling WLAN operations performed by the WLAN controller 250, a WPAN software driver for controlling WPAN operations performed by the WPAN controller 252, and/or a WWAN software driver for controlling WWAN operations performed by the WWAN controller 256.

In some aspects, a first coexistence interface 254 (such as a wired interface) may be used for sending information between the WLAN controller 250 and the WPAN controller 252. Additionally, or alternatively, in some aspects, a second coexistence interface 258 may be used for sending information between the WLAN controller 250 and the WWAN controller 256. Additionally, or alternatively, in some aspects, a third coexistence interface 260 may be used for sending information between the WPAN controller 252 and the WWAN controller 256.

In some aspects, one or more of the WLAN controller 250, the WPAN controller 252, and/or the WWAN controller 256 may be implemented as hardware, software, firmware, or any suitable combination thereof.

In some aspects, the WLAN controller 250 may be configured to communicate with a second device in a WPAN using a WLAN link using one or more, some, or all of the antennas 235a, 235b, 235c, and 235d. In other configurations, the WPAN controller 252 may be configured to communicate with at least one second device in a WPAN using one or more, some, or all of the antennas 235a, 235b, 235c, and 235d. In other configurations, the WWAN controller 256 may be configured to communicate with a second device in a WPAN using one or more, some, or all of the antennas 235a, 235b, 235c, and 235d. The WLAN controller 250, the WPAN controller 252, and/or the WWAN controller 256 may be configured to adjust a wakeup time interval and a shutdown time for the wireless communication device 200.

A short-range wireless communications protocol, such as BT, BLE, and/or BR/EDR, may include and/or may use one or more other communications protocols, for example, to establish and maintain communications links. Referring also to FIG. 1, the wireless communication device 200 may establish a communications link 116 with one or more peripheral devices, such as a wireless headset 112, according to at least one communications protocol for short-range wireless communications. In some aspects, the communications link 116 may include a communications link that adheres to a protocol included and/or for use with BT, BLE, BR/EDR, or the like. In one aspect, the communications link 116 may include an asynchronous connection-oriented logical (ACL) transport, sometimes referred to as an ACL link. When operating as an ACL link, the communications link 116 may allow the central device 102 (e.g., a source device) to connect or "pair" with a peripheral device, such as the headset 112. The connection is asynchronous in that the two devices may not need to synchronize, timewise, data communications between each other to permit communication of data packets via the communications link 116.

In some aspects, a logical link control and adaptation protocol (L2CAP) may be used within a BT protocol stack (not shown in FIG. 2 for simplicity). An L2CAP connection may be established after an ACL link has been established. Reference to L2CAP in the present disclosure may be further applicable to enhanced L2CAP (EL2CAP), which may be an enhanced version of the L2CAP protocol that enables multiplexing of multiple logical data channels via a single radio connection.

In some aspects, the communications link 116 may include an advanced audio distribution profile (A2DP) link. For example, an A2DP link may provide a point-to-point link between a source device, such as the central device 102, and a sink device, such as the headset 112. With an A2DP link, data packets including audio may be transmitted over an ACL channel, and other information (e.g., for controlling the audio stream) may be transmitted over a separate control channel. The data packets may occur non-periodically.

In some aspects, the communications link 116 may support synchronous logical transport mechanisms between a source device (such as the central device 102) and a peripheral device (such as the headset 112). For example, the communications link 116 may include a synchronous connection-oriented (SCO) link that provides a symmetric point-to-point link between the source device and the peripheral device using time slots reserved for BT communications. In some aspects, an SCO link may not support retransmission of data packets, which may be unsatisfactory in audio streaming and/or voice call use cases in which a dropped audio or voice packet may reduce the quality of the user experience.

In some aspects, the communications link 116 may include an extended SCO (eSCO) link. An eSCO link may provide a symmetric or asymmetric point-to-point link between a source device and a peripheral device using time slots reserved for BT communications, and may also provide for a retransmission window following the reserved time slots. Because retransmissions may be facilitated using the retransmission window, an eSCO link may be suitable for audio streaming and/or voice call use cases because a dropped audio or voice packet may be retransmitted, and therefore the probability of successfully receiving a data packet may be increased.

In some aspects, the communications link 116 shown in FIG. 1 may include an isochronous (ISO) link. When operating as an ISO link, the communications link 116 may combine some features of both synchronous and asynchronous links. For example, a stream on an ISO link may begin with a start packet, and then data packets may be asynchronously transmitted. On an ISO link, the number of retransmission attempts by a transmitting device may be limited. Thus, if a receiving device is unable to decode a data packet within the limited number of retransmission attempts, then the data packet may be dropped, and the receiving device may continue to receive the stream without data from the dropped data packet.

In some aspects, a wireless communication device (e.g., a central device 102, a handset, a user equipment (UE), an AP, an STA, a peripheral device, an earbud, a wearable device, a portable speaker) includes means for scanning a first channel for access points during a first non-extended-personal-area-network (non-XPAN) service period; and means for scanning the first channel in one or more additional non-XPAN service periods. The means for the wireless communication device to perform operations described herein may include, for example, one or more of antennas 235a-235d, WPAN controller 252, radio 230, and/or processor 202, among other examples.

As indicated above, FIG. 2 is provided as an example. Other examples may differ from what is described with regard to FIG. 2.

Figure 3:
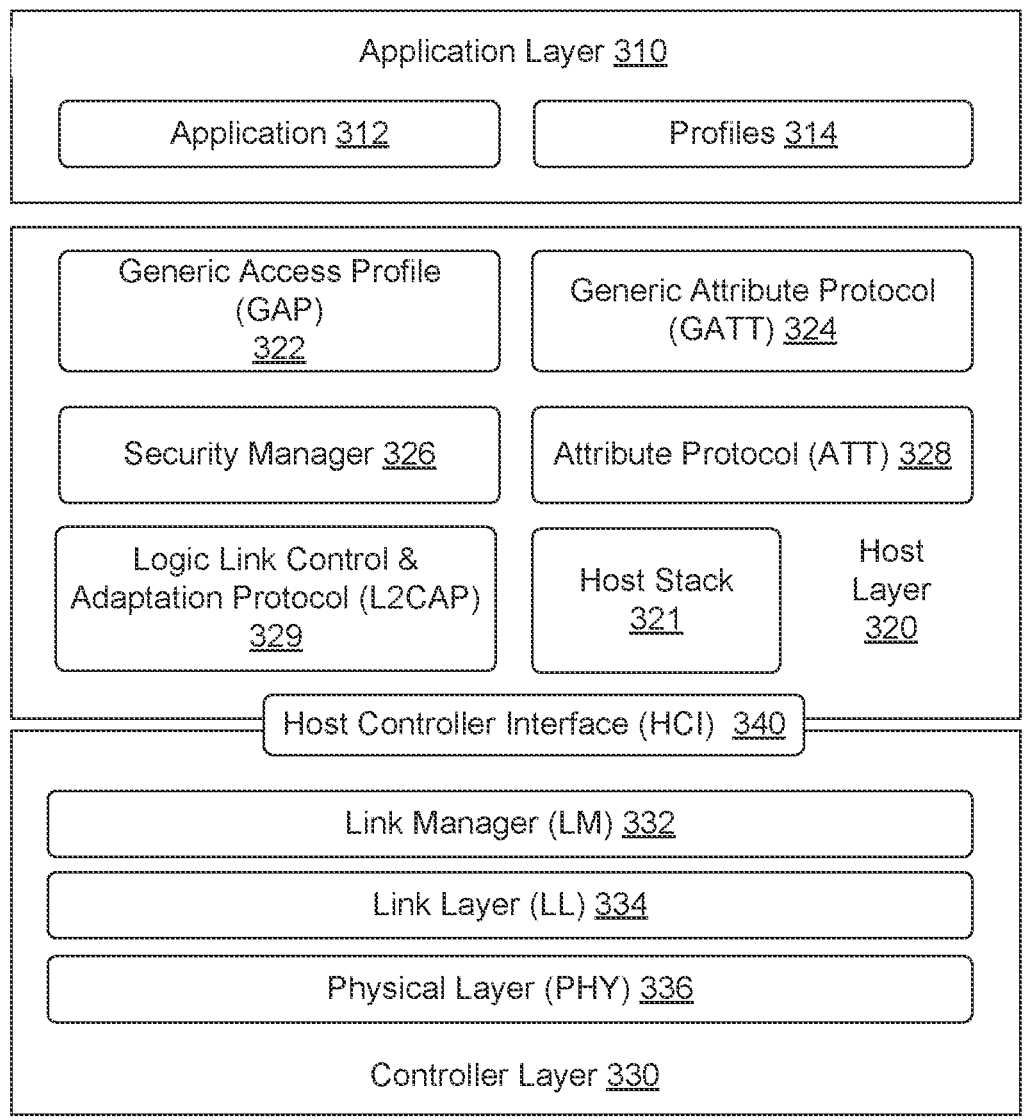
FIG. 3 is a diagram illustrating an example of a protocol stack, in accordance with the present disclosure.

FIG. 3 is a diagram illustrating an example 300 of a protocol stack (e.g., a WPAN and/or a Bluetooth protocol stack), in accordance with the present disclosure. In some aspects, the protocol stack 300 may be implemented in a wireless communication device (such as the central device 102 or one or more of the peripheral devices 104, 106, 108, 110, 112, or 114 of FIG. 1). For example, the protocol stack 300 may be implemented by one or more of processor(s) 202, memory 206, flash memory 210, ROM 208, the radio 230, and/or the WPAN controller 252 illustrated in FIG. 2. In some aspects, the protocol stack 300 may be organized into three layers that include an application layer 310, a host layer 320, and a controller layer 330.

In some aspects, the application layer 310 may be a user application layer that interfaces with the other blocks and/or layers of the protocol stack 300. In some aspects, the application layer 310 may include one or more applications 312 and one or more Bluetooth profiles 314 that allow the one or more applications 312 to use Bluetooth and/or BLE communications. The host layer 320 may include the upper layers of the protocol stack 300, and may communicate with a controller (such as the WPAN controller 252 of FIG. 2) in a wireless communication device using a host controller interface (HCI) 340. In some aspects, the host layer 320 may include a host stack 321 that can be used for application layer interface management to allow an application 312 to access WPAN communications.

The controller layer 330 may include the lower layers of the protocol stack 300. In some aspects, the controller layer 330 may be used for hardware interface management, link establishment, and link management. As shown in FIG. 3, the controller layer 330 may include a link manager (LM) 332, a link layer 334, and a physical (PHY) layer 336. The PHY layer 336 may include, for example, a radio and/or a baseband processor. In some aspects, the PHY layer 336 may define a mechanism for transmitting a bit stream over a physical link or channel that connects WPAN devices. The bit stream may be grouped into code words or symbols, and may be converted to a data packet that is transmitted over a wireless transmission medium. The PHY layer 336 may provide an electrical, mechanical, and/or procedural interface to the wireless transmission medium. The PHY layer 336 may be responsible for modulation and demodulation of data into radio frequency (RF) signals for transmission over the air. The PHY layer 336 may describe the physical characteristics of a transmitter/receiver (or transceiver) included in a wireless communication device. The physical characteristics may include modulation characteristics, an RF tolerance, and/or a sensitivity level, among other examples.

In some aspects, the link layer 334 is responsible for low-level communication over the PHY layer 336. The link layer 334 may manage the sequence and timing for transmitting and receiving data packets, and using an LL protocol, communicates with other devices regarding connection parameters and data flow control. The link layer 334 also provides gatekeeping functionality to limit exposure and data exchange with other devices. If filtering is configured, the link layer 334 maintains a list of allowed devices and may ignore all requests for data exchange from devices not on the list of allowed devices. The link layer 334 may also reduce power consumption. In some aspects, the link layer 334 may include a proprietary LL that may be used to discover peer devices, and establish a secure communication channel with the peer devices. In some aspects, the link layer 334 may be responsible for transporting data packets between devices in a WPAN. Each data packet may include an access address, which specifies the type of logical transport used to carry the data packet. Logical transports may exist between a master device and slave devices. Additionally, some logical transports may carry multiple logical links.

The link manager 332 may be responsible for establishing and configuring links and managing power-change requests, among other tasks. Each type of logical link, such as ACL links, A2DP links, SCO links, eSCO links, ISO links, or the like, may be associated with a specific packet type. For example, an SCO link may provide reserved channel bandwidth for communication between a central device and a peripheral device, and may support regular, periodic exchange of data packets with no retransmissions. An eSCO link may provide reserved channel bandwidth for communication between a source device and a peripheral device, and support regular, periodic exchange of data packets with retransmissions. An ACL link may exist between a source device and a peripheral device from the beginning of establishment of a connection between the source device and the peripheral device, and the data packets for ACL links may include encoding information in addition to a payload.

The link manager 332 may communicate with the host layer 320 using the HCI 340. In some aspects, the link manager 332 may translate commands associated with the HCI 340 into controller-level operations, such as baseband-level operations. The HCI 340 may act as a boundary between the lower layers (such as between the controller layer 330, the host layer 320, and the application layer 310). The BT specification may define a standard HCI to support BT systems that are implemented across two separate processors. For example, a BT system on a computer may use a processor of the BT system to implement the lower layers of the protocol stack 300, such as the PHY layer 336, the link layer 334, and/or the link manager 332, and may use a processor of a BT component to implement the other layers of the protocol stack 300, such as the host layer 320 and the application layer 310.

In FIG. 3, the host layer 320 is shown to include a generic access profile (GAP) 322, a generic attribute protocol (GATT) 324, a security manager (SM) 326, an attribute protocol (ATT) 328, and an L2CAP layer 329. The GAP 322 may provide an interface for an application 312 to initiate, establish, and manage connections with other WPAN (e.g., BT or BLE) devices. The GATT 324 may provide a service framework using the attribute protocol for discovering services, and for reading and writing characteristic values on a peer device. The GATT 324 may interface with the application 312, for example, through a profile which may define a collection of attributes and any permissions needed for the attributes to be used in BT or BLE communications.

The security manager 326 may be responsible for device pairing and key distribution. A security manager protocol implemented by the security manager 326 may define how communications with the security manager of a counterpart BLE device are performed. The security manager 326 provides additional cryptographic functions that may be used by other components of the protocol stack 300. The architecture of the security manager 326 used in WPAN communications is designed to minimize recourse requirements for peripheral devices by shifting work to a presumably more powerful central device. BLE uses a pairing mechanism for key distribution. The security manager 326 provides a mechanism to encrypt the data and a mechanism to provide data authentication.

The ATT 328 includes a client/server protocol based on attributes associated with a BLE device configured for a particular purpose. Examples may include monitoring heart rate, temperature, broadcasting advertisements, or the like. The attributes may be discovered, read, and written by peer devices. The set of operations which are executed over the ATT 328 may include error handling, server configuration, find information, read operations, write operations, and/or queued writes. The ATT 328 may form the basis of data exchange between BT and BLE devices.

The L2CAP layer 329 may be implemented above the HCI 340, and may communicate with the controller layer 330 through the HCI 340. The L2CAP layer 329 may be responsible for establishing connections across one or more existing logical links and for requesting additional links if none exist. The L2CAP layer 329 may also implement multiplexing between different higher-layer protocols, for example, to allow different applications to use a single link, such as a logical link, including an ACL link. In some implementations, the L2CAP layer 329 may encapsulate multiple protocols from the upper layers into a data packet format (and vice versa). The L2CAP layer 329 may also break packets with a large data payload from the upper layers into multiple packets with the data payload segmented into smaller size data payloads that fit into a maximum payload size (for example, twenty-seven (27) bytes) on the transmit side.

In some standards and protocols, such as BLE and/or BR/EDR, the central device 102 may detect errors in a packet and/or a dropped/missed/not received packet through the use of cyclic redundancy check (CRC) validation and through the use of message integrity code (MIC) validation. MIC validation may be used when a packet is encrypted. For example, failure of CRC validation may indicate one or more errors in a received packet, and failure of MIC validation may indicate that another packet has not been received (although failure of CRC validation may also indicate that another packet has not been received, and/or failure of MIC validation may also indicate one or more errors in a received packet).

CRC validation and MIC validation may be based on generating CRC values and MICs, respectively, based on received packets and respectively comparing those generated CRC values and MICs to CRC values and MICs included in the received packets. Specifically, a receiving device, such as the headset 112, that receives a packet may first generate a CRC value or a CRC checksum based on the received packet, such as based on a payload and, if applicable, an MIC included in the received packet. The receiving device may compare the generated CRC value with a CRC value included in the received packet. If the generated CRC value matches the CRC value included in the received packet, then the received packet may be validated for CRC. The CRC-validated received packet may then be decrypted. However, if the generated CRC value does not match the CRC value included in the received packet, then the receiving device may determine that the received packet fails CRC validation. If the receiving device determines that the received packet fails CRC validation, then the received packet may include errors and/or may be corrupted. In one configuration, the receiving device may discard the received packet that fails CRC validation. Alternatively, in another configuration, the receiving device may attempt to recover the received packet, for example, using one or more error correction techniques.

If the received packet is encrypted and passes CRC validation, then the receiving device may decrypt the received packet to obtain a decrypted payload and a decrypted MIC. For MIC validation, the receiving device may generate an MIC based on the decrypted payload, and compare the generated MIC with the MIC obtained from the decrypted received packet. If the generated MIC matches the decrypted MIC, then the receiving device may determine that the received packet is successfully decrypted. When the received packet is successfully decrypted, the decoded and decrypted payload of the received packet may be provided to another layer of the receiving device, such as a coder-decoder (codec) of the receiving device that may cause the payload data of the received packet to be output by the receiving device, for example, as audio through speakers of the headset 112.

If the generated MIC does not match the decrypted MIC of the received packet, then the receiving device may determine that the received packet is unsuccessfully decrypted. When the received packet is unsuccessfully decrypted, then a different packet may have been missed or the received packet may be erroneous or otherwise corrupted. In one configuration, the receiving device may discard the received packet that fails MIC validation. Alternatively, in another configuration, the receiving device may attempt to recover the received packet.

As indicated above, FIG. 3 is provided as an example. Other examples may differ from what is described with regard to FIG. 3.

Figure 4:
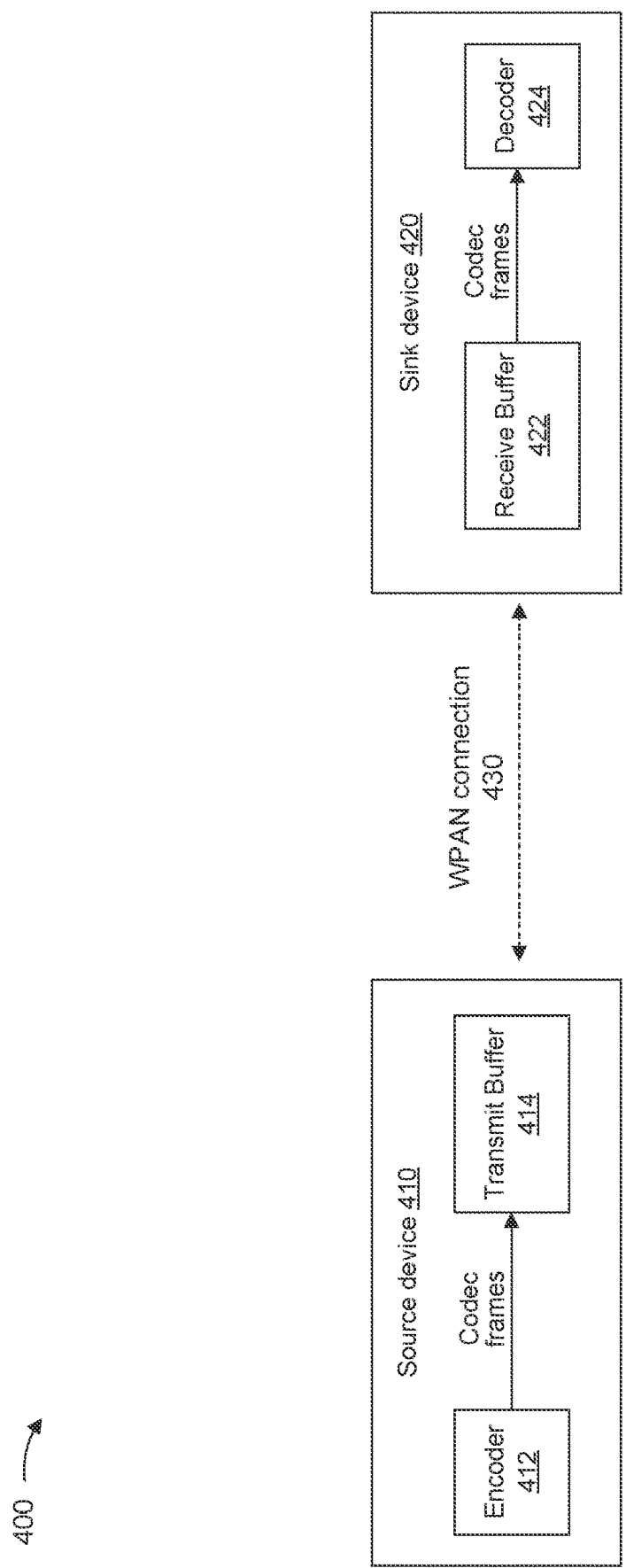
FIG. 4 is a diagram illustrating an example transmission of a data packet from a wireless communication device to a peripheral device over a WPAN connection, in accordance with the present disclosure.

FIG. 4 is a diagram illustrating an example transmission 400 of a data packet from a source device 410 to a sink device 420 over a WPAN connection 430, according to the present disclosure. In some aspects, the source device 410 may be one example of the central device 102 in FIG. 1 and/or the wireless communication device 200 in FIG. 2, and the sink device 420 may be an example of one or more of the peripheral devices 104, 106, 108, 110, 112 or 114 in FIG. 1. In some aspects, the sink device 420 may be a wireless earbud, a pair of wireless earbuds, a wireless portable speaker, or another suitable device. The WPAN connection 430 may be any suitable Bluetooth or BLE connection or link. In some instances, the WPAN connection 430 may be one or more of an ACL link, an L2CAP link, an A2DP link, an SCO link, or an ISO link.

As shown in FIG. 4, the source device 410 may include an encoder 412 and a transmit buffer 414. The encoder 412 may be configured to encode data, such as audio or video data, using a specified bitrate. The transmit buffer 414 may be configured to queue data packets that are to be transmitted over the WPAN connection 430 to the sink device 420. In some implementations, the data packets to be transmitted over the WPAN connection 430 may have a predefined size, for example, based on the type of WPAN connection 430 and/or channel conditions associated with the WPAN connection 430. In some aspects, data encoded by the encoder 412 may be packetized into a data packet of a predefined size. The source device 410 may de-queue data packets from the transmit buffer 414 and transmit the data packets to the sink device 420 over the WPAN connection 430.

As further shown in FIG. 4, the sink device 420 may include a receive buffer 422 and a decoder 424. Data packets that the sink device 420 receives over the WPAN connection 430 may be queued or otherwise stored in the receive buffer 422. The data packets may be output from the receive buffer 422 and forwarded to the decoder 424. In some aspects, the decoder 424 may decode data (such as audio and/or video data) carried in the payloads of the queued data packets, and forward the decoded data to upper layers of the protocol stack for processing and playback to a user. In some implementations, the encoder 412 may encode a first encoder/decoder (codec) frame using a first bitrate and forward the first codec frame to the transmit buffer 414 to be packetized for transmission to the sink device 420 over the WPAN connection 430. The sink device 420 may queue the received data packet in the receive buffer 422 and may forward the first portion of the first codec frame to the decoder 424 for decoding.

As indicated above, FIG. 4 is provided as an example. Other examples may differ from what is described with regard to FIG. 4.

Figure 5:
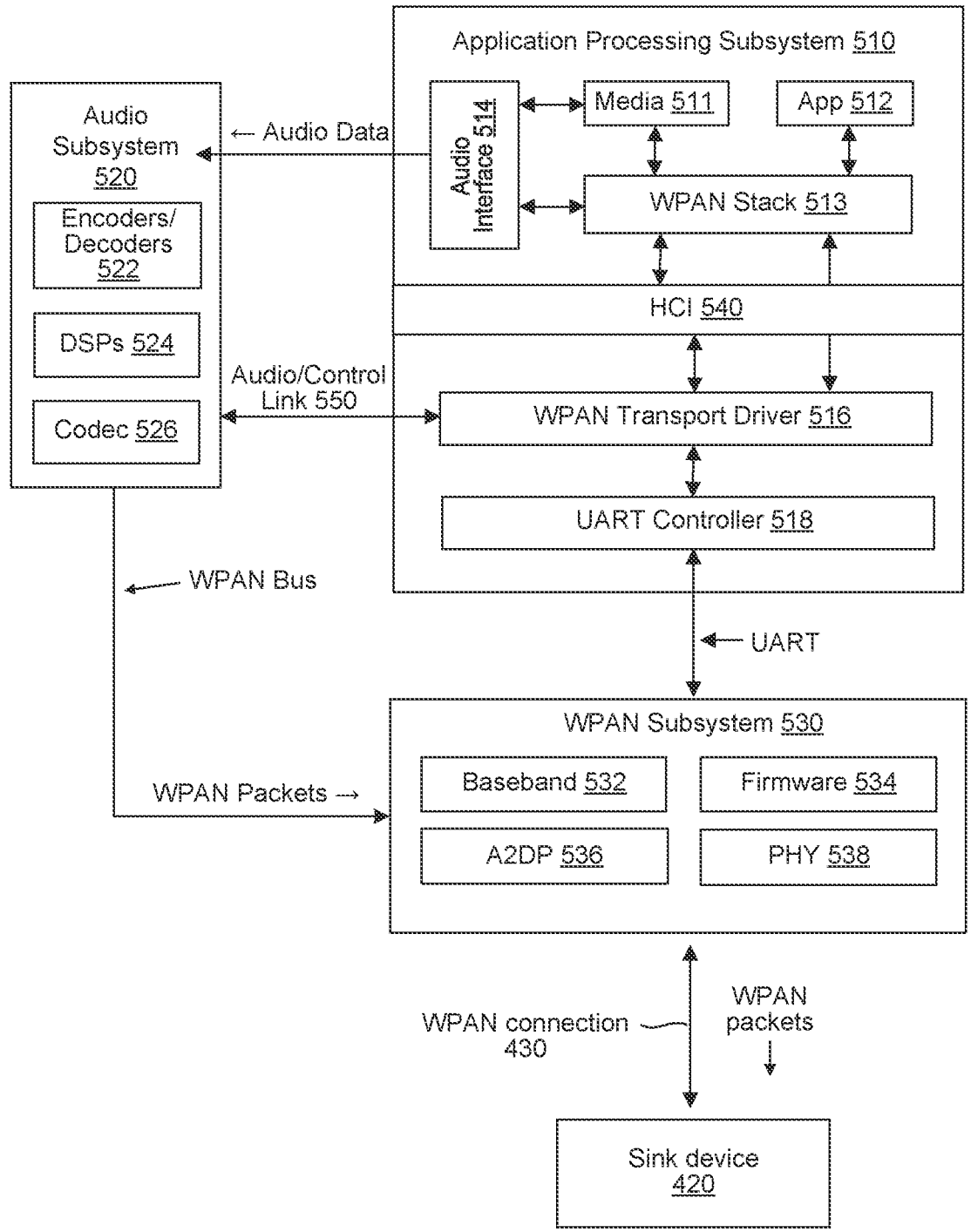
FIG. 5 is a diagram illustrating an example of a wireless communication device, in accordance with the present disclosure.

FIG. 5 is a diagram illustrating an example 500 of a wireless communication device 500, according to the present disclosure. In some aspects, the wireless communication device 500 may be an example of the central device 102 in FIG. 1, the wireless communication device 200 in FIG. 2, or the source device 410 in FIG. 4. In example 500, the wireless communication device 500 is depicted as having an established WPAN connection 430 (e.g., a Bluetooth communication connection) with the sink device 420 in FIG. 4.

The wireless communication device 500 may include an application processing subsystem 510, an audio subsystem 520, a WPAN subsystem 530, and an HCI 540. The application processing subsystem 510, which may correspond to at least some portions of the application layer 310 and the host layer 320 of the protocol stack 300 of FIG. 3, is shown to include a media player 511, an application layer 512, a WPAN stack 513, and an audio interface 514. The media player 511 can be any suitable device or component capable of generating or receiving multimedia content including, for example, real-time audio streams, real-time video streams, real-time gaming streams, and/or latency-sensitive traffic, among other examples. The application layer 512, which may be one implementation of the application layer 310 of FIG. 3, includes at least one Bluetooth profile that defines the collection of attributes and associated permissions to be used in Bluetooth or BLE communications. In some aspects, the application layer 512 may include processing resources including, for example, the memory 206, the ROM 208, and/or the flash memory 210 of FIG. 2. The WPAN stack 513 may be one implementation of the protocol stack 300 of FIG. 3.

In some aspects, as shown in FIG. 5, the application processing subsystem 510 may include a WPAN transport driver 516, which may include a split audio and packetization module (not shown for simplicity) that can packetize data (such as audio and/or video data) into Bluetooth frames that can be transmitted to the sink device 420 using a Bluetooth and/or BLE protocol. In some aspects, the WPAN transport driver 516 may be connected to the audio subsystem 520 via an audio and control link 550. In some aspects, the audio and control link 550 may be used to send encoded audio/video data and control signals between the WPAN transport driver 516 and audio/video DSPs within the audio subsystem 520. The WPAN transport driver 516 is also connected to a universal asynchronous receiver-transmitter (UART) controller 518 that provides controls for transmission of information via the WPAN connection 430.

The audio subsystem 520 may include encoders/decoders 522, one or more DSPs 524, and one or more codecs 526. The encoders/decoders 522 may be used to sample audio/video data extracted from one or more packets received from another wireless communication device. The extracted audio/video data may be processed in the application processing subsystem 510 based at least in part on the Bluetooth profile. In some implementations, the encoders/decoders 522 may partition the sampled audio/video data into payloads that can be embedded within one or more Bluetooth packets for transmission to the sink device 420 over the WPAN connection 430. In some instances, the DSPs 524 and/or the codecs 526 may employ one or more encoding or decoding algorithms in conjunction with sampling the audio data.

The WPAN subsystem 530 may include a baseband component 532 (e.g., a Bluetooth baseband component), a firmware component 534, an A2DP component 536, and a PHY component 538. The baseband component 532 and the firmware component 534 may be used to generate baseband signals for constructing and deconstructing data frames based on the Bluetooth or BLE protocol. The baseband component 532 and the firmware component 534 may also be used to generate carrier signals for up-converting baseband signals during data transmissions and for down-converting received data signals to baseband. The A2DP component 536 may be used to control or manage an A2DP link between the wireless communication device 500 and the sink device 420. Specifically, when the WPAN subsystem 530 is in a receive mode, the PHY component 538 can be used to receive, demodulate, and down-convert data packets received over the WPAN connection 430, and to forward the data packets to the application processing subsystem 510. When the WPAN subsystem 530 is in a transmit mode, the PHY component 538 can be used to encapsulate data provided from the upper layers into one or more Bluetooth frames or packets for transmission to the sink device 420 over the WPAN connection 430.

As indicated above, FIG. 5 is provided as an example. Other examples may differ from what is described with regard to FIG. 5.

Figure 6:
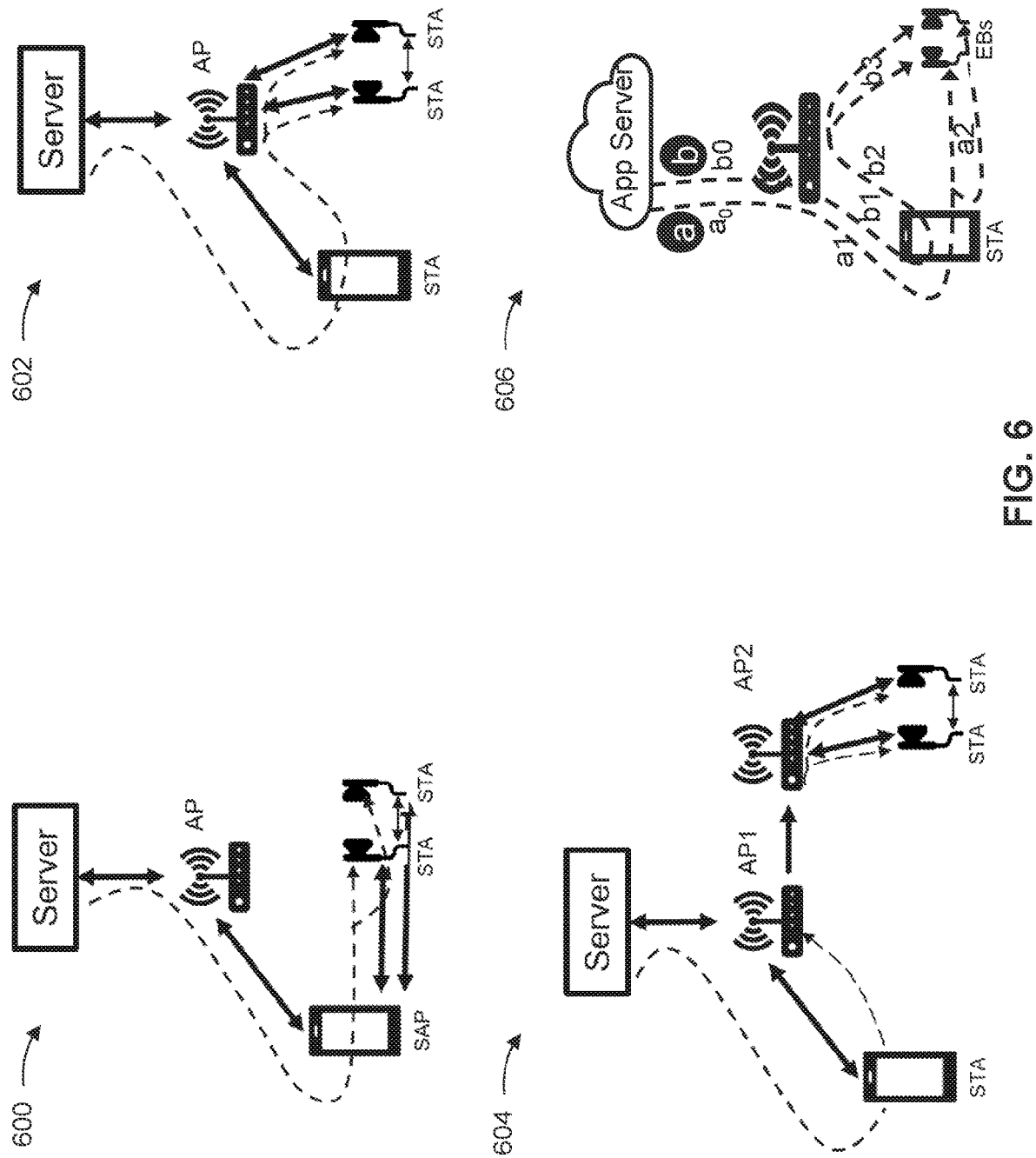
FIG. 6 is a diagram illustrating examples of extended personal area network (XPAN) topologies, in accordance with the present disclosure.

FIG. 6 is a diagram illustrating examples 600, 602, 604, and 606 of XPAN topologies, in accordance with the present disclosure.

A wireless communication device, such as a handset (HS) device or STA (e.g., phone), may operate as part of an XPAN that provides WHC. In an XPAN, the Bluetooth upper layers of the protocol stack can be reused and a transport flow from the Bluetooth controller to the Wi-Fi controller for transmitting audio packets can be changed such that the handset can connect to peripheral devices (e.g., earbuds) via an AP. By connecting to an AP, Wi-Fi features can be used to extend the connection between the handset and the earbuds beyond the range of Bluetooth for better WHC. For example, the handset may transmit audio data to an AP, which will then transmit the audio data to the earbuds. This means that a user can leave the handset on a desk in one room and hear the audio in the earbuds (or continue a phone call) in another room that is outside of the normal Bluetooth range (but within the range of the AP). In this way, a user does not need to carry the handset throughout the home or office to use wireless earbuds.

Example 600 shows an XPAN topology where the handset device may communicate with peripheral devices (e.g., earbuds (EB)) or other STAs as part of a peer-to-peer (P2P) link that uses low energy (LE) protocols (e.g., BLE protocols). With P2P, the handset sends Wi-Fi information to the earbuds vie BLE and the earbuds can use Wi-Fi. The handset device may provide communications between the peripheral devices and an AP. The handset has a Wi-Fi direct link to the AP. There may not be any EB direct measurements and thus the handset may infer such EB statistics. There may be a one layer to two layer (1L2) flow or a one layer to four layer (1L4) flow in uplink or downlink. Communications may be TWT-based with synchronized end-to-end (E2E) timing. TWT involves the use of a schedule for waking up to communicate and powering down to conserve power. This XPAN topology may obtain optimal power and concurrency performance.

Example 602 shows an XPAN topology with communications between a handset and earbuds over one AP. There may be control information or a switching request that uses Wi-Fi transmission control protocol (TCP) or a Glink. Audio and earbud latency statistics may be provided over a Wi-Fi direct link, and there may be direct earbud statistics collection. There may be a 1L2 flow or a two layer to four layer (2L4) flow. The E2E timing may not be synchronized.

Example 604 shows an XPAN topology that involves an AP-to-AP link, where the APs use the same subnet or a different subnet. The handset and earbuds may communicate over two or more APs. The earbuds may roam, and the AP mesh network manages the link. The E2E timing is not synchronized. This XPAN topology may have more latency and consume more power than other XPAN topologies.

Example 606 shows an XPAN topology that involves links from an application server to earbuds through a handset (STA) or an AP. The link $a_1$ from the application server to the handset may be Wi-Fi or cellular. The P2P link $a_2$ from the handset to the earbuds may be Wi-Fi 6G/5G/2G or BLE. The link $b_1$ from the handset to the AP may be Wi-Fi or cellular. The link $b_2$ and $b_3$ can be 6G/5G/2G.

When neither the central device (e.g., handset, AP) nor the earbuds support TWT, the earbuds may use power management signals to conserve power. The central device may receive a power management (PM) signal (e.g., PM0) indicating that the earbuds are ready to power up, activate, or wake up, and a PM signal (e.g., PM1) indicating that the earbuds are to power down. When the earbuds wake up to retrieve traffic from the central device, the earbuds do not know the end of the traffic burst accumulated at the central device. Therefore, the earbuds may implement an inactivity time out (ITO) mechanism. ITO is a period of time that the earbuds will be active in anticipation of packet reception from the central device. ITO may increase power consumption on the earbuds and hence reduces the battery life of the earbuds, resulting in a poorer user experience.

As indicated above, FIG. 6 is provided as an example. Other examples may differ from what is described with regard to FIG. 6.

Figure 7:
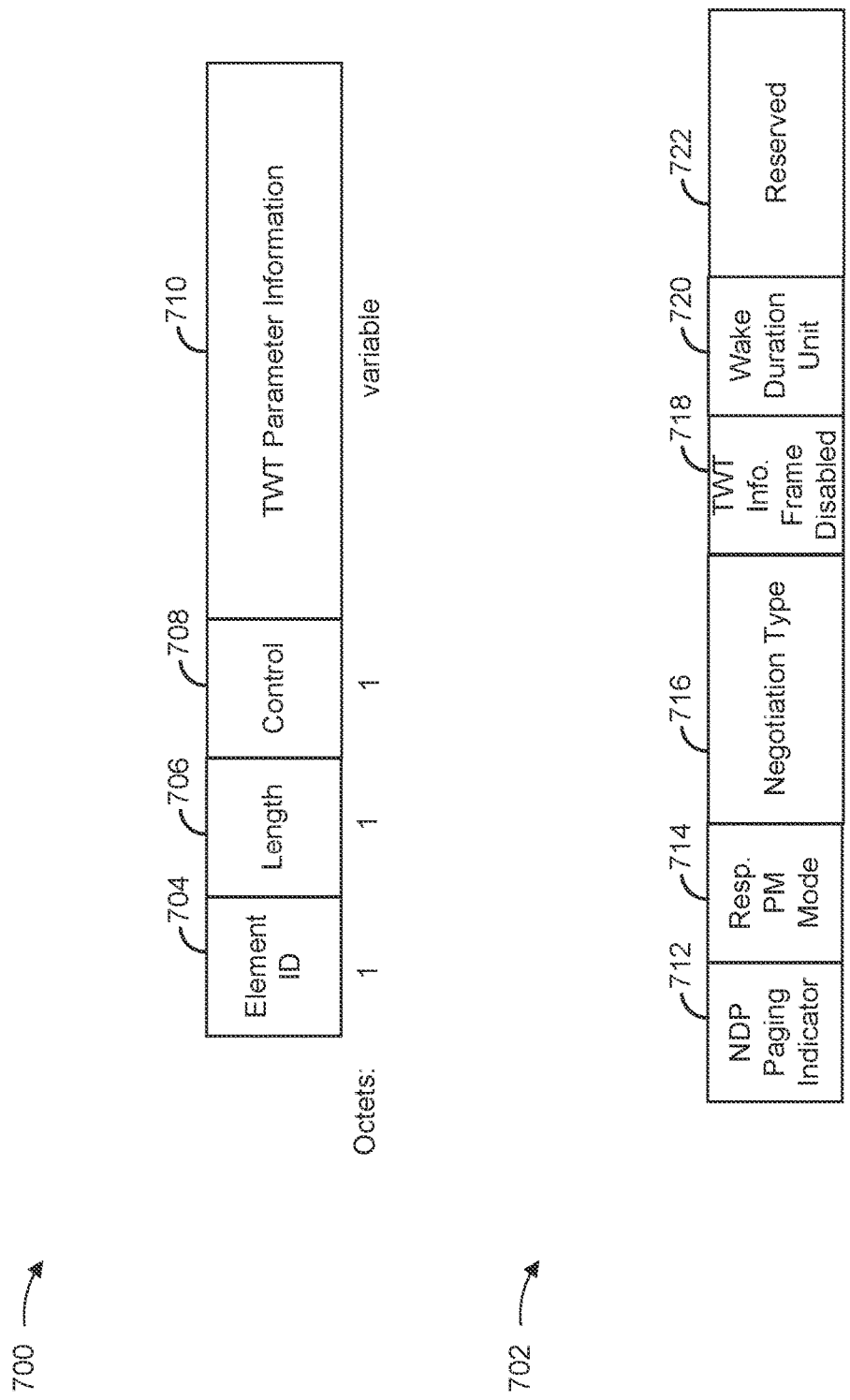
FIG. 7 is a diagram illustrating examples of target wake time (TWT) information, in accordance with the present disclosure.

FIG. 7 is a diagram illustrating examples 700 and 702 of TWT information, in accordance with the present disclosure.

STAs may use TWT scheduling to conserve battery power and to avoid uplink access contention. TWT allows a central device, such as an AP, to manage activity in the basic service set (BSS) in order to minimize contention between the STAs and to reduce the required amount of time that a STA utilizing a power management mode needs to be awake. The AP may schedule TWT time durations during which a STA is awake and/or has uplink access to the wireless network. The STA is otherwise asleep and/or does not have uplink access to the network.

The AP may transmit TWT information such that STAs may follow a TWT schedule. FIG. 7 shows examples 700 and 702 of TWT information. Example 700 shows a TWT element format that includes an element identifier (ID) 704, a length 706, control information 708, and TWT parameter information 710 that is variable. Example 702 shows a TWT information element (IE) control field that includes a null data packet (NDP) paging indicator 712, a responder PM mode 714, a negotiation type 716, an indicator of TWT information frame disabled 718, a wake duration unit 720, and a reserved field 722. The negotiation type is set to 1 for broadcast TWT. The negotiation type is set to 0 for individual TWT. The AP (or SAP) may advertise Broadcast TWT requesting its associated clients to join an existing TWT session.

As indicated above, FIG. 7 is provided as an example. Other examples may differ from what is described with regard to FIG. 7.

Figure 8:
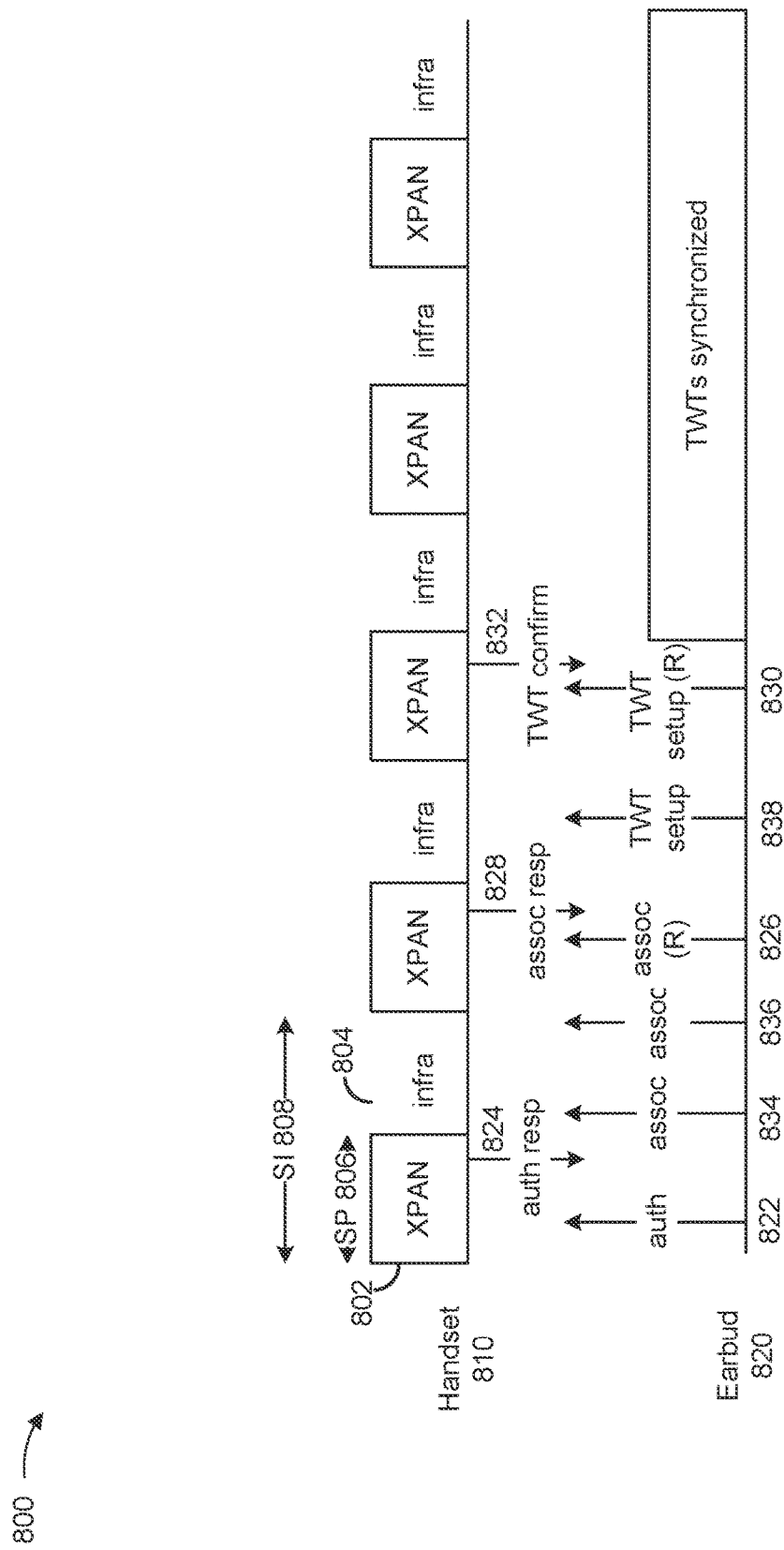
FIG. 8 is a diagram illustrating an example of XPAN association, in accordance with the present disclosure.

FIG. 8 is a diagram illustrating an example 800 of XPAN association, in accordance with the present disclosure.

XPAN communications may involve communications between a central device, such as a handset (e.g., UE, XPAN SAP), and peripheral devices (e.g., earbuds) during XPAN time windows and communications between the handset and another device (e.g., AP, network entity) during infra time windows. When the handset forms a multi-channel concurrency (MCC) with an infra interface, XPAN and infra link grants are timeshared. Example 800 shows XPAN time windows 802 and infra time windows 804. An XPAN time window 802 may be the length of an SP 806, and the length of an XPAN time window and an infra time window may be a service interval (SI) 808.

An earbud 820 may seek to setup or synchronize a TWT schedule such that the earbud 820 can transmit data to or receive data (in frames) from a handset device 810 during TWT awake times. To synchronize the TWTs, the earbud 820 transmits an authentication message 822 and receives an authentication response 824. The earbud 820 is then able to associate with the handset device 810 by transmitting an association message 826 and receiving an association response 828 if the association message 826 is received (R) by the handset device 810. The earbud 820 then transmits a TWT setup message 830 and receives a TWT confirmation message 832 if the TWT setup message 830 is received. The TWTs are then synchronized.

In some XPAN techniques, the handset device 810 does not indicate the availability of XPAN time windows 802, and no unicast frames are to be triggered from the earbud 820 during the infra time windows 804. If the earbud 820 transmits a message during an infra time window, when the handset device 810 can be communicating with another device (e.g., AP, gNB), the message is not received by the handset device 810 and the message is wasted. For example, association message 834 and association message 836 are transmitted during an infra time window and are thus wasted. TWT setup message 838 is also transmitted during an infra time window and is wasted. Wasted messages waste power and signaling resources.

Some XPAN techniques may also use a CTS2Self message for traffic shaping prior to TWT session setup between a handset and earbuds. The earbud 820 (of the earbuds) may transmit a request to send (RTS) message in order for the handset to send a clear to send (CTS) message that silences nearby STAs so that the sender of the RTS message is clear to transmit. A CTS2Self message involves a CTS message without an RTS message. The CTS2Self message may be a special frame where the destination address and the source address are the same. With a CTS2Self message, a maximum of 32 milliseconds (ms) can be protected. If channel grants for infra links are more than the 32 ms, the extra duration is not protected on the XPAN channel. Any earbud association or TWT setup messages during this duration would result in failures and subsequent retries, which also wastes power and signaling resources.

As indicated above, FIG. 8 is provided as an example. Other examples may differ from what is described with regard to FIG. 8.

Figure 9:
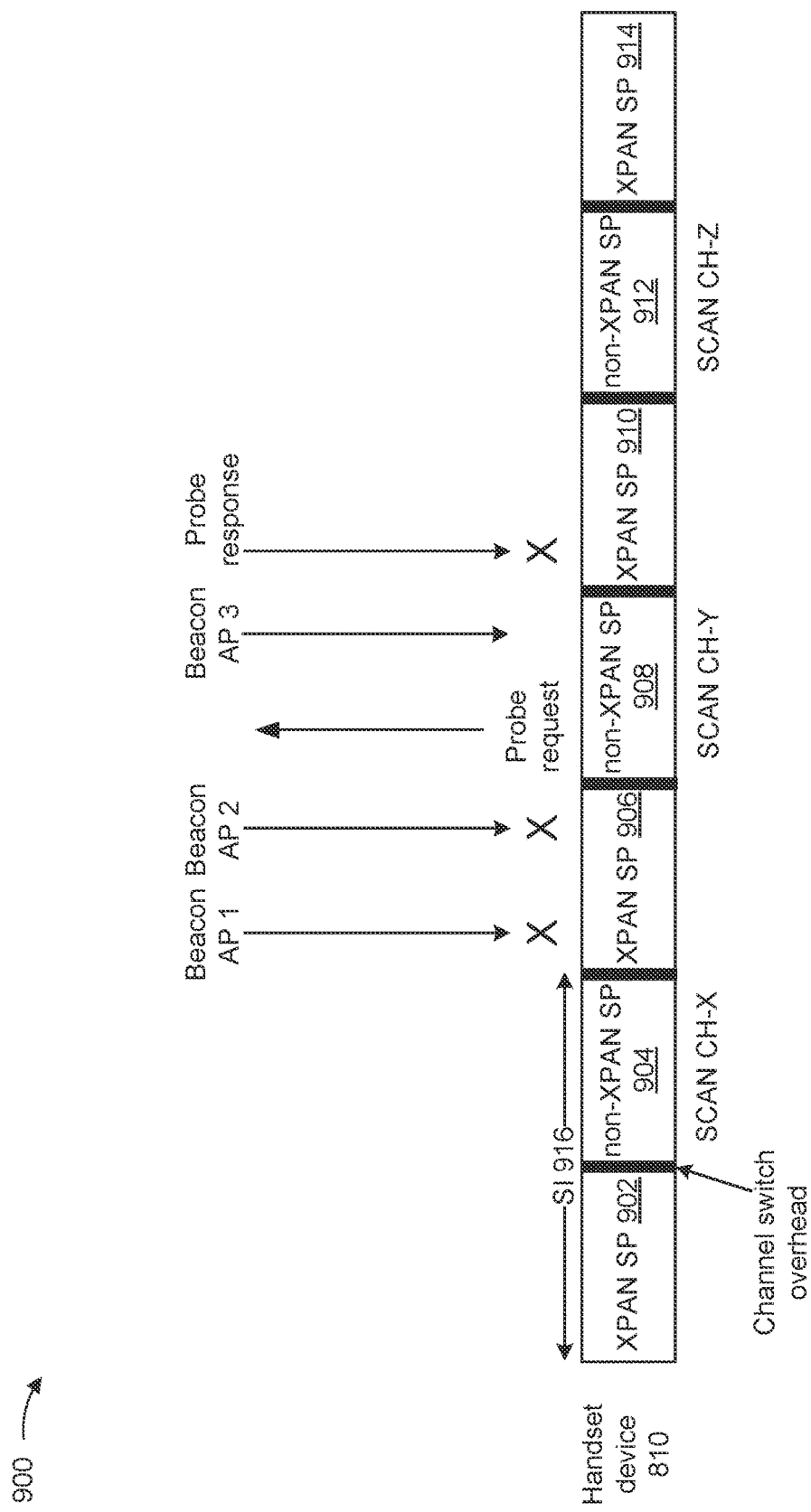
FIG. 9 is a diagram illustrating an example of service periods, in accordance with the present disclosure.

FIG. 9 is a diagram illustrating an example 900 of service periods, in accordance with the present disclosure.

In some examples, an XPAN SAP may be running on a handset device, such as handset device 810. A TWT session may be established with peripheral devices (e.g., earbuds) and the handset device 810 may expect to enter an XPAN channel based on the TWT SP. The handset device 810 may use a non-XPAN SP to go to any foreign channel (non-XPAN channel). However, scan results may be impacted when the handset device 810 is expected to enter an XPAN channel based on the TWT service interval, and the handset device 810 may not get a chance to stay on a scan channel for an expected amount of time. Therefore, scanning must be performed only in the non-XPAN SPs. Example 900 shows an XPAN SP 902 that is followed by a non-XPAN SP 904. Example 900 also shows non-XPAN SP 908 and non-XPAN SP 912. The handset device 810 may scan for channels in the non-XPAN SPs, which are separated by XPAN SP 906, XPAN SP 910, and XPAN SP 914. XPAN SP 902 and non-XPAN SP 904 form an SI 916, and there is some channel switch overhead at the beginning of the non-XPAN SPs.

If the non-XPAN SP time duration is small, the handset device 810 may have less time to scan on a given channel. This may lead to low scan results as the handset device 810 may not be able to scan all of the APs available in the channel. If the handset device 810 spends less time on the scan channel, there is a chance that the handset device 810 may miss a probe response from an AP when the device enters or switches to an XPAN channel. Example 900 shows the handset device scanning channel X in non-XPAN SP 904 but missing beacons from AP1 and AP2 during XPAN SP 906. The handset device 810 may scan for channel Y and transmit a probe request during non-XPAN SP 908. The handset device may receive a beacon from AP 3 during non-XPAN SP 908, but miss the probe response in XPAN SP 910. That is, because the handset device 810 scans for different channels in the non-XPAN windows, the handset may have trouble staying on a channel for a sufficient amount of time to receive beacons from APs.

Furthermore, the non-XPAN SP cannot be increased in duration too much as the use of the non-XPAN SP impacts the XPAN traffic. Passive channels may have more impact as the handset device 810 may not stay a minimum of a beacon interval time (~102 milliseconds (ms)) in a passive channel to scan all APs passively. If the handset device 810 misses AP beacons after scanning different channels, the handset device 810 may not connect to an AP or may connect to a sub-optimal AP. This may result in increased latency and degraded traffic, which can waste signaling resources.

As indicated above, FIG. 9 is provided as an example. Other examples may differ from what is described with regard to FIG. 9.

Figure 10:
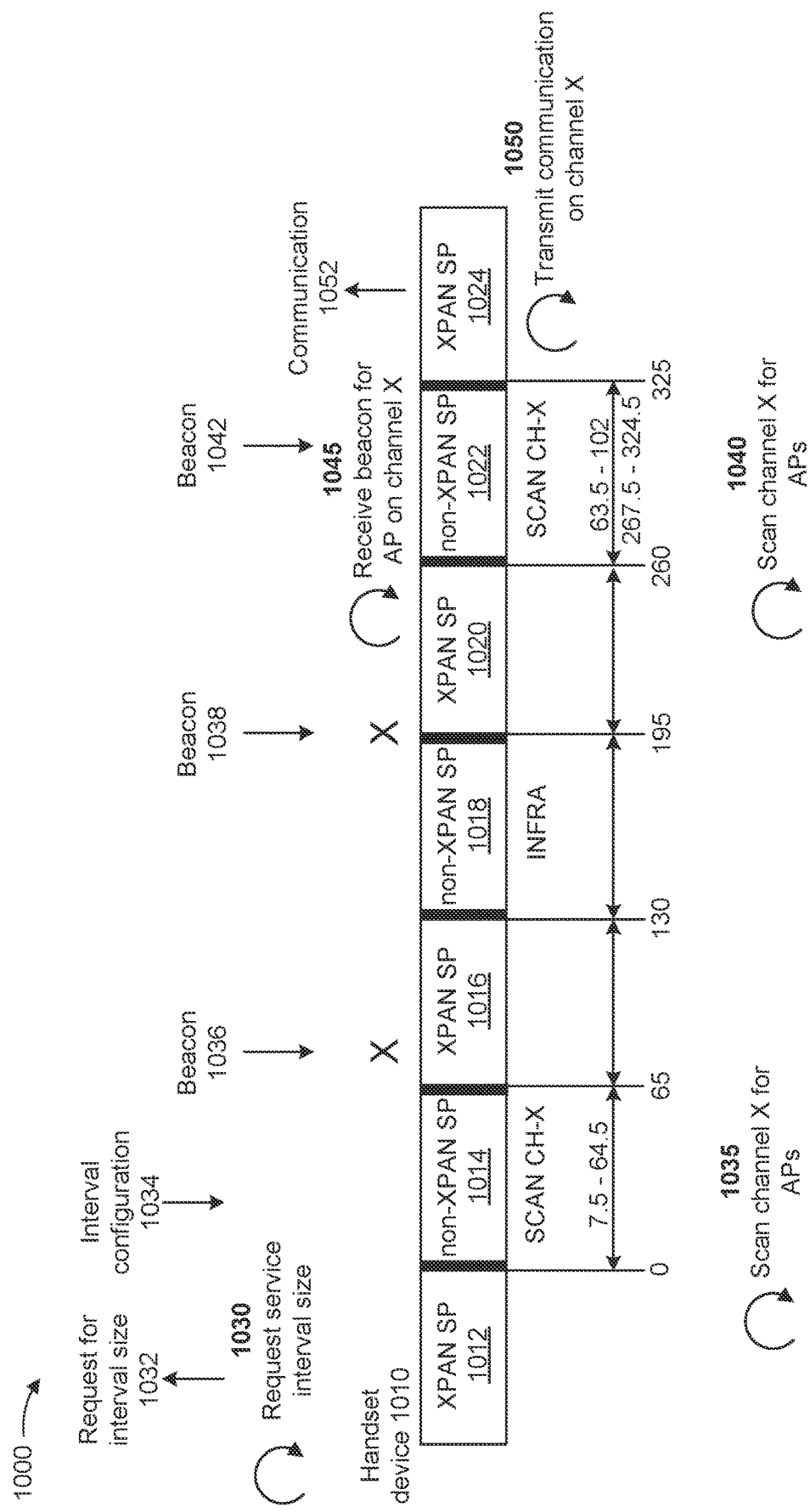
FIG. 10 is a diagram illustrating an example of scanning a channel, in accordance with the present disclosure.

FIG. 10 is a diagram illustrating an example 1000 of scanning a channel, in accordance with the present disclosure. Example 1000 shows SPs for a handset device 1010 (e.g., a wireless communication device 200), including XPAN SP 1012, non-XPAN SP 1014, XPAN SP 1016, non-XPAN SP 1018, XPAN SP 1020, non-XPAN SP 1022, and XPAN SP 1024. Non-XPAN SP 1014 is a first non-XPAN SP. Non-XPAN SP 1018 and non-XPAN SP 1022 may be considered to be additional non-XPAN SPs. The SI in example 1000 is 130 ms, or 65 ms per SP.

According to various aspects described herein, the handset device 1010 may scan for the same channel over multiple consecutive non-XPAN SPs. The handset device 1010 may scan the same channel multiple times so that an entire 102 ms of beacon intervals are covered. If device can cover the entire 102 ms non-overlapping time period with respect to the beacon interval, the handset device 1010 may have a 100% chance of obtaining scan results. If scan results are successful, an optimal AP may be used and communications may be successful. Successful communications reduce latency and conserve signaling resources.

Example 1000 shows the handset device 1010 scanning a channel (e.g., channel X). In some aspects, as shown by reference number 1030, the handset device 1010 may request a TWT SI size. This may include transmitting a request for an interval size 1032 to a TWT module that configures the handset device 1010 and receiving an interval configuration 1034. SI sizes will be discussed further in connection with FIGS. 11 and 12.

As shown by reference number 1035, the handset device 1010 may scan channel X for APs in non-XPAN SP 1014. The scan may start 7.5 ms after the start of non-XPAN SP 1014 (due to the channel switch delay) and end 64.5 ms after the start of non-XPAN SP 1014 (if the total SI is 130 ms). The handset device 1010 may not receive any beacons in non-XPAN SP 1014. Example 1000 shows beacon 1036 was transmitted during XPAN SP 1016 and was not received by the handset device 1010. Beacon 1038 was transmitted during XPAN SP 1020 and was not received by the handset device 1010. As shown by reference number 1040, the handset device 1010 may scan channel X during non-XPAN SP 1022, which is the third consecutive non-XPAN SP (non-XPAN SP 1018 was an infra SP for communicating with the network or another device). The handset device 1010 may scan channel X from 63.5 ms to 102 ms of the full beacon interval. As shown by reference number 1045, the handset device 1010 may receive beacon 1042 on channel X. The entire beacon interval of 102 ms was covered and a beacon was received when scanning the same channel X.

The handset device 1010 may use channel X. As shown by reference number 1050, the handset device 1010 may transmit a communication 1052 on channel X during XPAN SP 1024. The handset device 1010 may successfully communicate with an AP on channel X.

As indicated above, FIG. 10 is provided as an example. Other examples may differ from what is described with regard to FIG. 10.

FIG. 11 is a diagram illustrating an examples 1100, 1102, and 1104 of scan times, in accordance with the present disclosure.

In some aspects, the TWT SI may not be 130 ms. If the SI is shorter, such as 70 ms, the scan time is shorter (35 ms). With 7.5 ms channel switch delays, there may be only 20 ms at each iteration (non-XPAN SP) to scan a channel. Example 1100 shows start and end times for scanning with an SI of 70 ms.

In some aspects, the quantity of iterations for scanning the same channel is based at least in part on the XPAN SI. It is not always guaranteed that, even though the same channel is scanned a quantity N of times, the entire beacon interval will be covered for certain SI intervals. Example 1102 shows scan amounts of the 102 ms beacon interval that are scanned for different quantities of iterations, including additional non-XPAN SPs (XSs). For example, the handset device 1010 may scan six non-XPAN SPs to increase the chance of receiving a beacon during the 102 ms beacon interval. Even then, the amount of the beacon interval that the handset device 1010 scans is 78 ms of the 102 ms. Example 1104 shows beacon interval scan amounts for other SIs, such as 120 ms, 110 ms, 100 ms, and 90 ms.

As indicated above, FIG. 11 is provided as an example. Other examples may differ from what is described with regard to FIG. 11.

FIG. 12 is a diagram illustrating an examples 1200 and 1202 of scan times, in accordance with the present disclosure.

Example 1200 shows scan times for a TWT SI of 130 ms. Example 1202 reinforces the effectiveness of 130 ms, where three or more iterations (two or more additional non-XPAN SPs) provides for channel scanning during a full 102 ms of the beacon interval. The handset device 1010 may request an SI of 130 ms if the SI is less than 130 ms (or at least an SI closer to 130 ms).

In some aspects, the handset device 1010 may scan 5G active, 6G primary synchronization code (PSC) channels, or 6G non-PSC channels only for one iteration as a single non-XPAN SP (~60 ms), which may be sufficient to cover the default dwell time. In some aspects the handset device 1010 may scan passive channels in an unconnected scan case. The handset device 1010 may cover the entire 102 ms if the same channel is scanned for three iterations (XS1 XS1 XS1). The second non-XPAN SP may be used for scanning a channel and not infra.

In some aspects, in a connected scan case, the handset device 1010 may enter an STA home channel along with XPAN+scan channels. The handset device 1010 may enter the STA home channel after every scan iteration (XS1 XH XS1). The second non-XPAN SP may be used for infra so that data transmission and reception is resumed. It may be better to use the second non-XPAN SP for infra as reception data can be present from an AP at any point of time, and the STA may be expected to be in a home channel to receive the data. In this way, the entire 102 ms beacon interval may be covered with less impact on the STA interface. If the TWT SI is not 130 ms, the scan module of the handset device 1010 may request a TWT module to re-negotiate the TWT SI to 130 ms until the scan is completed, to achieve good scan results.

As indicated above, FIG. 12 is provided as an example. Other examples may differ from what is described with regard to FIG. 12.

Figure 13:
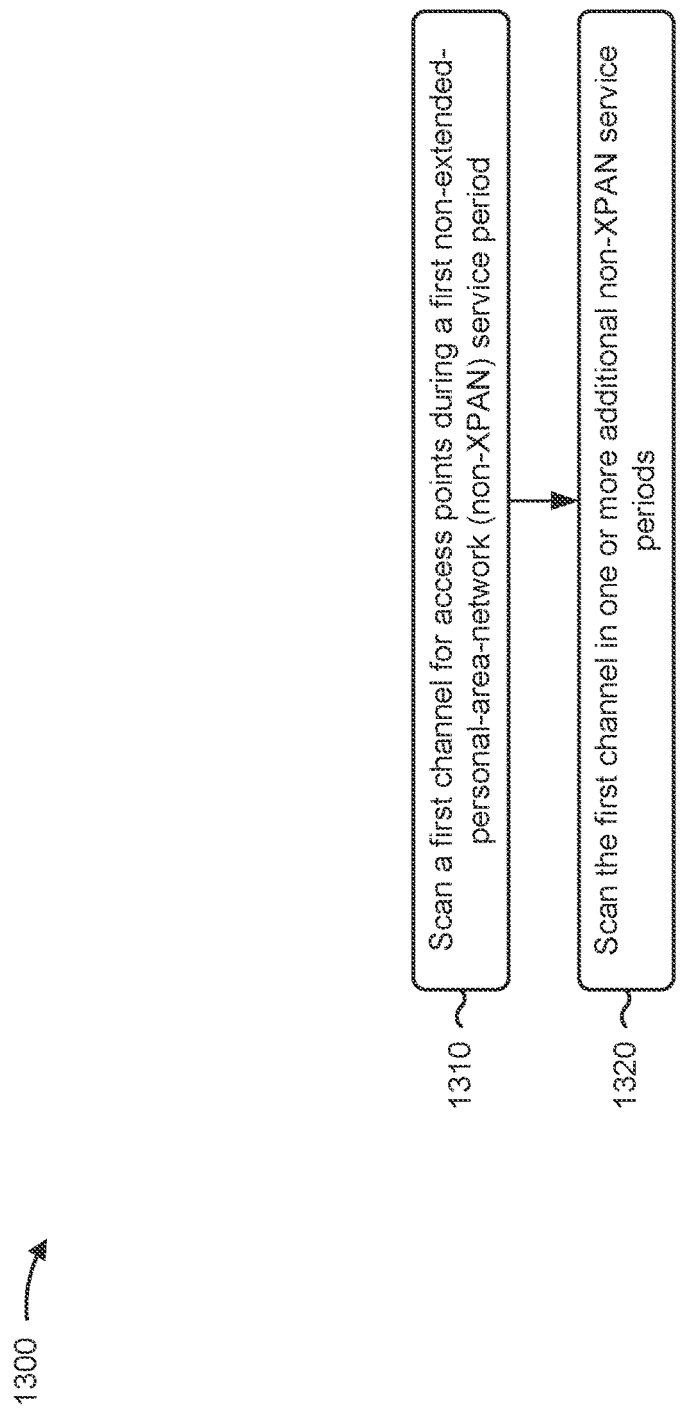
FIG. 13 is a diagram illustrating an example process performed, for example, at a wireless communication device or an apparatus of a wireless communication device, in accordance with the present disclosure.

FIG. 13 is a diagram illustrating an example process 1300 performed, for example, at a wireless communication device or an apparatus of a wireless communication device, in accordance with the present disclosure. Example process 1300 is an example where the apparatus or the wireless communication device (e.g., wireless communication device 200) performs operations associated with channel scanning in multiple SPs.

As shown in FIG. 13, in some aspects, process 1300 may include scanning a first channel for access points during a first non-XPAN service period (block 1310). For example, the wireless communication device (e.g., using communication manager 1406, depicted in FIG. 14) may scan a first channel for access points during a first non-XPAN service period, as described above.

As further shown in FIG. 13, in some aspects, process 1300 may include scanning the first channel in one or more additional non-XPAN service periods (block 1320). For example, the wireless communication device (e.g., using communication manager 1406, depicted in FIG. 14) may scan the first channel in one or more additional non-XPAN SPs, as described above.

Process 1300 may include additional aspects, such as any single aspect or any combination of aspects described below and/or in connection with one or more other processes described elsewhere herein.

In a first aspect, process 1300 includes receiving a beacon for an AP on the first channel in at least one non-XPAN SP of the one or more additional non-XPAN SPs.

In a second aspect, alone or in combination with the first aspect, process 1300 includes transmitting a communication to the access point on the first channel.

In a third aspect, alone or in combination with one or more of the first and second aspects, the beacon for the AP was not received in the first non-XPAN SP.

In a fourth aspect, alone or in combination with one or more of the first through third aspects, a second non-XPAN SP is an infra SP, and scanning the first channel in the one or more additional non-XPAN SPs includes scanning the first channel in a third non-XPAN SP.

In a fifth aspect, alone or in combination with one or more of the first through fourth aspects, the first non-XPAN SP, the second non-XPAN SP, and the third non-XPAN SP are consecutive non-XPAN SPs.

In a sixth aspect, alone or in combination with one or more of the first through fifth aspects, a first XPAN SP is between the first non-XPAN SP and the second non-XPAN SP, and a second XPAN SP is between the second non-XPAN SP and the third non-XPAN SP.

In a seventh aspect, alone or in combination with one or more of the first through sixth aspects, a quantity of the one or more additional non-XPAN SPs is based at least in part on an SI size of each of the one or more additional non-XPAN SPs.

In an eighth aspect, alone or in combination with one or more of the first through seventh aspects, the SI size is 130 ms, and the quantity of the one or more additional non-XPAN SPs is one.

In a ninth aspect, alone or in combination with one or more of the first through eighth aspects, process 1300 includes transmitting a request for an SI size.

In a tenth aspect, alone or in combination with one or more of the first through ninth aspects, the SI size is 130 ms.

In an eleventh aspect, alone or in combination with one or more of the first through tenth aspects, the SI size is less than 130 milliseconds, and a quantity of the one or more additional non-XPAN SPs is greater than one.

In a twelfth aspect, alone or in combination with one or more of the first through eleventh aspects, scanning the first channel in the one or more additional non-XPAN SPs includes scanning the first channel in a second non-XPAN SP.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
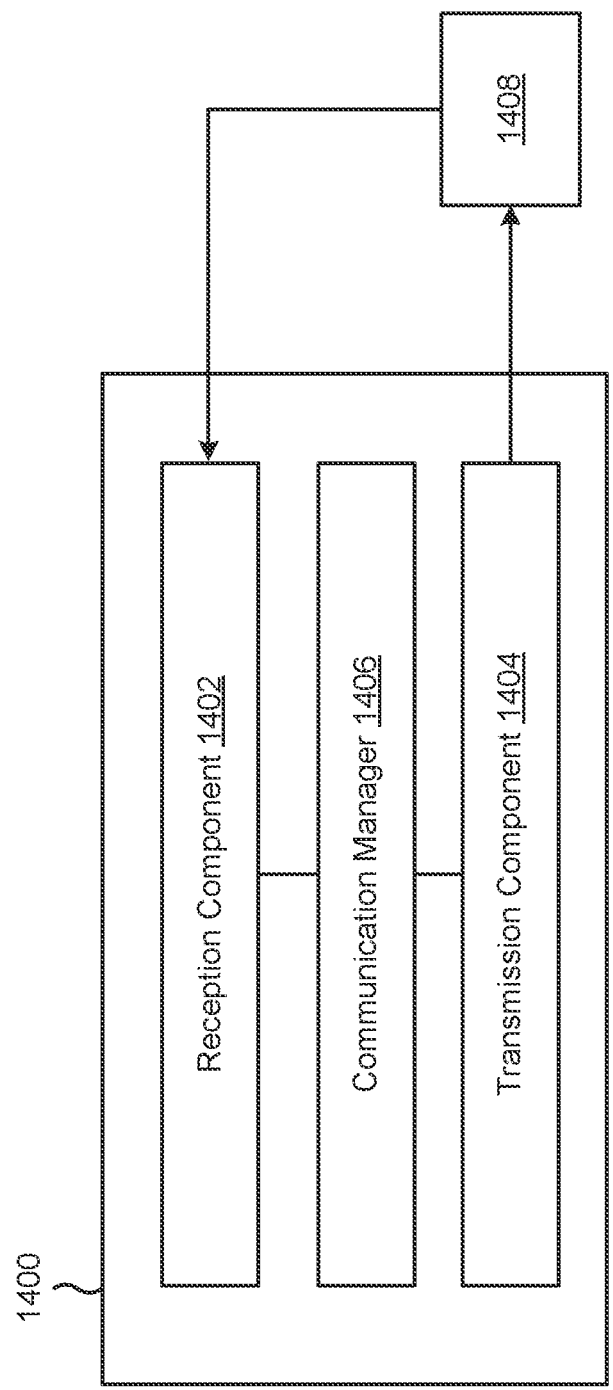
FIG. 14 is a diagram of an example apparatus for wireless communication, in accordance with the present disclosure.

FIG. 14 is a diagram of an example apparatus 1400 for wireless communication, in accordance with the present disclosure. The apparatus 1400 may be a wireless communication device, or a wireless communication device may include the apparatus 1400. In some aspects, the apparatus 1400 includes a reception component 1402, a transmission component 1404, and/or a communication manager 1406, which may be in communication with one another (for example, via one or more buses and/or one or more other components). In some aspects, the communication manager 1406 is the WPAN controller 252 described in connection with FIG. 2. As shown, the apparatus 1400 may communicate with another apparatus 1408, such as an AP, a peripheral device, or a TWT module, using the reception component 1402 and the transmission component 1404.

In some aspects, the apparatus 1400 may be configured to perform one or more operations described herein in connection with FIGS. 1-12. Additionally, or alternatively, the apparatus 1400 may be configured to perform one or more processes described herein, such as process 1300 of FIG. 13. In some aspects, the apparatus 1400 and/or one or more components shown in FIG. 14 may include one or more components of the wireless communication device described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1402 may receive communications, such as reference signals, control information, data communications, or a combination thereof, from the apparatus 1408. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, one or more modems, one or more demodulators, one or more multiple-input multiple-output (MIMO) detectors, one or more receive processors, one or more controllers/processors, one or more memories, or a combination thereof, of the wireless communication device described in connection with FIG. 2.

The transmission component 1404 may transmit communications, such as reference signals, control information, data communications, or a combination thereof, to the apparatus 1408. In some aspects, one or more other components of the apparatus 1400 may generate communications and may provide the generated communications to the transmission component 1404 for transmission to the apparatus 1408. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1408. In some aspects, the transmission component 1404 may include one or more antennas, one or more modems, one or more modulators, one or more transmit MIMO processors, one or more transmit processors, one or more controllers/processors, one or more memories, or a combination thereof, of the wireless communication device described in connection with FIG. 2. In some aspects, the transmission component 1404 may be co-located with the reception component 1402 in one or more transceivers.

The communication manager 1406 may support operations of the reception component 1402 and/or the transmission component 1404. For example, the communication manager 1406 may receive information associated with configuring reception of communications by the reception component 1402 and/or transmission of communications by the transmission component 1404. Additionally, or alternatively, the communication manager 1406 may generate and/or provide control information to the reception component 1402 and/or the transmission component 1404 to control reception and/or transmission of communications.

The communication manager 1406 may scan a first channel for access points during a first non-XPAN SP. The communication manager 1406 may scan the first channel in one or more additional non-XPAN SPs.

The reception component 1402 may receive a beacon for an AP on the first channel in at least one non-XPAN SP of the one or more additional non-XPAN SPs. The transmission component 1404 may transmit a communication to the access point on the first channel. The transmission component 1404 may transmit a request for an SI size.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a wireless communication device, comprising: scanning a first channel for access points during a first non-extended-personal-area-network (non-XPAN) service period; and scanning the first channel in one or more additional non-XPAN service periods.

Aspect 2: The method of Aspect 1, further comprising receiving a beacon for an access point on the first channel in at least one non-XPAN service period of the one or more additional non-XPAN service periods.

Aspect 3: The method of Aspect 2, further comprising transmitting a communication to the access point on the first channel.

Aspect 4: The method of Aspect 2, wherein the beacon for the access point was not received in the first non-XPAN service period.

Aspect 5: The method of any of Aspects 1-4, wherein a second non-XPAN service period is an infra service period, and wherein scanning the first channel in the one or more additional non-XPAN service periods includes scanning the first channel in a third non-XPAN service period.

Aspect 6: The method of Aspect 5, wherein the first non-XPAN service period, the second non-XPAN service period, and the third non-XPAN service period are consecutive non-XPAN service periods.

Aspect 7: The method of Aspect 6, wherein a first XPAN service period is between the first non-XPAN service period and the second non-XPAN service period, and wherein a second XPAN service period is between the second non-XPAN service period and the third non-XPAN service period.

Aspect 8: The method of any of Aspects 1-7, wherein a quantity of the one or more additional non-XPAN service periods is based at least in part on a service interval size of each of the one or more additional non-XPAN service periods.

Aspect 9: The method of Aspect 8, wherein the service interval size is 130 milliseconds, and wherein the quantity of the one or more additional non-XPAN service periods is one.

Aspect 10: The method of any of Aspects 1-9, further comprising transmitting a request for a service interval size.

Aspect 11: The method of Aspect 10, wherein the service interval size is 130 milliseconds.

Aspect 12: The method of Aspect 10, wherein the service interval size is less than 130 milliseconds, and wherein a quantity of the one or more additional non-XPAN service periods is greater than one.

Aspect 13: The method of any of Aspects 1-12, wherein scanning the first channel in the one or more additional non-XPAN service periods includes scanning the first channel in a second non-XPAN service period.

Aspect 14: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-13.

Aspect 15: An apparatus for wireless communication at a device, the apparatus comprising one or more memories and one or more processors coupled to the one or more memories, the one or more processors configured to cause the device to perform the method of one or more of Aspects 1-13.

Aspect 16: An apparatus for wireless communication, the apparatus comprising at least one means for performing the method of one or more of Aspects 1-13.

Aspect 17: A non-transitory computer-readable medium storing code for wireless communication, the code comprising instructions executable by one or more processors to perform the method of one or more of Aspects 1-13.

Aspect 18: A non-transitory computer-readable medium storing a set of instructions for wireless communication, the set of instructions comprising one or more instructions that, when executed by one or more processors of a device, cause the device to perform the method of one or more of Aspects 1-13.

Aspect 19: A device for wireless communication, the device comprising a processing system that includes one or more processors and one or more memories coupled with the one or more processors, the processing system configured to cause the device to perform the method of one or more of Aspects 1-13.

Aspect 20: An apparatus for wireless communication at a device, the apparatus comprising one or more memories and one or more processors coupled to the one or more memories, the one or more processors individually or collectively configured to cause the device to perform the method of one or more of Aspects 1-13.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a wireless communication device, comprising:
   one or more memories; and
   one or more processors, coupled to the one or more memories, individually or collectively configured to cause the wireless communication device to:
      scan a first channel for access points during a first non-extended-personal-area-network (non-XPAN) service period; and
      scan the first channel in one or more additional non-XPAN service periods.

2. The apparatus of claim 1, wherein the one or more processors are individually or collectively configured to cause the wireless communication device to receive a beacon for an access point on the first channel in at least one non-XPAN service period of the one or more additional non-XPAN service periods.

3. The apparatus of claim 2, wherein the one or more processors are individually or collectively configured to cause the wireless communication device to transmit a communication to the access point on the first channel.

4. The apparatus of claim 2, wherein the beacon for the access point was not received in the first non-XPAN service period.

5. The apparatus of claim 1, wherein a second non-XPAN service period is an infra service period, and wherein to cause the wireless communication device to scan the first channel in the one or more additional non-XPAN service periods, the one or more processors are individually or collectively configured to cause the wireless communication device to scan the first channel in a third non-XPAN service period.

6. The apparatus of claim 5, wherein the first non-XPAN service period, the second non-XPAN service period, and the third non-XPAN service period are consecutive non-XPAN service periods.

7. The apparatus of claim 6, wherein a first XPAN service period is between the first non-XPAN service period and the second non-XPAN service period, and wherein a second XPAN service period is between the second non-XPAN service period and the third non-XPAN service period.

8. The apparatus of claim 1, wherein a quantity of the one or more additional non-XPAN service periods is based at least in part on a service interval size of each of the one or more additional non-XPAN service periods.

9. The apparatus of claim 8, wherein the service interval size is 130 milliseconds, and wherein the quantity of the one or more additional non-XPAN service periods is one.

10. The apparatus of claim 1, wherein the one or more processors are individually or collectively configured to cause the wireless communication device to transmit a request for a service interval size.

11. The apparatus of claim 10, wherein the service interval size is 130 milliseconds.

12. The apparatus of claim 10, wherein the service interval size is less than 130 milliseconds, and wherein a quantity of the one or more additional non-XPAN service periods is greater than one.

13. The apparatus of claim 1, wherein to cause the wireless communication device to scan the first channel in the one or more additional non-XPAN service periods, the one or more processors are individually or collectively configured to cause the wireless communication device to scan the first channel in a second non-XPAN service period.

14. A method of wireless communication performed by a wireless communication device, comprising:
    scanning a first channel for access points during a first non-extended-personal-area-network (non-XPAN) service period; and
    scanning the first channel in one or more additional non-XPAN service periods.

15. The method of claim 14, further comprising receiving a beacon for an access point on the first channel in at least one non-XPAN service period of the one or more additional non-XPAN service periods.

16. The method of claim 15, further comprising transmitting a communication to the access point on the first channel.

17. The method of claim 15, wherein the beacon for the access point was not received in the first non-XPAN service period.

18. The method of claim 14, wherein a second non-XPAN service period is an infra service period, and wherein scanning the first channel in the one or more additional non-XPAN service periods includes scanning the first channel in a third non-XPAN service period.

19. The method of claim 18, wherein the first non-XPAN service period, the second non-XPAN service period, and the third non-XPAN service period are consecutive non-XPAN service periods.

20. The method of claim 19, wherein a first XPAN service period is between the first non-XPAN service period and the second non-XPAN service period, and wherein a second XPAN service period is between the second non-XPAN service period and the third non-XPAN service period.

21. The method of claim 14, wherein a quantity of the one or more additional non-XPAN service periods is based at least in part on a service interval size of each of the one or more additional non-XPAN service periods.

22. The method of claim 21, wherein the service interval size is 130 milliseconds, and wherein the quantity of the one or more additional non-XPAN service periods is one.

23. The method of claim 14, further comprising transmitting a request for a service interval size.

24. The method of claim 23, wherein the service interval size is 130 milliseconds.

25. The method of claim 23, wherein the service interval size is less than 130 milliseconds, and wherein a quantity of the one or more additional non-XPAN service periods is greater than one.

26. The method of claim 14, wherein scanning the first channel in the one or more additional non-XPAN service periods includes scanning the first channel in a second non-XPAN service period.

27. A non-transitory computer-readable medium storing a set of instructions for wireless communication, the set of instructions comprising:
    one or more instructions that, when executed by one or more processors of a wireless communication device, cause the wireless communication device to:
        scan a first channel for access points during a first non-extended-personal-area-network (non-XPAN) service period; and
        scan the first channel in one or more additional non-XPAN service periods.

28. The non-transitory computer-readable medium of claim 27, wherein the one or more instructions further cause the wireless communication device to receive a beacon for an access point on the first channel in at least one non-XPAN service period of the one or more additional non-XPAN service periods.

29. An apparatus for wireless communication, comprising:
    means for scanning a first channel for access points during a first non-extended-personal-area-network (non-XPAN) service period; and
    means for scanning the first channel in one or more additional non-XPAN service periods.

30. The apparatus of claim 29, further comprising means for receiving a beacon for an access point on the first channel in at least one non-XPAN service period of the one or more additional non-XPAN service periods.

* * * * *